(12) United States Patent
Ikeda et al.

(10) Patent No.: US 7,018,674 B2
(45) Date of Patent: Mar. 28, 2006

(54) MANUFACTURING METHODS AND APPARATUSES OF AN OPTICAL DEVICE AND A REFLECTION PLATE PROVIDED WITH A RESIN THIN FILM HAVING A MICRO-ASPERITY PATTERN

(75) Inventors: Masaaki Ikeda, Kyoto (JP); Akihiro Funamoto, Nara (JP); Motohiko Matsushita, Mishima-gun (JP); Shigeru Aoyama, Kyoto (JP)

(73) Assignee: Omron, Corporation, Kyoto (JP)

( * ) Notice: Subject to any disclaimer, the term of this patent is extended or adjusted under 35 U.S.C. 154(b) by 358 days.

(21) Appl. No.: 10/084,641

(22) Filed: Feb. 27, 2002

(65) Prior Publication Data
US 2002/0121339 A1  Sep. 5, 2002

(30) Foreign Application Priority Data
Mar. 1, 2001 (JP) .............................. 2001-056693

(51) Int. Cl.
| | | |
|---|---|---|
| B05D 3/02 | (2006.01) | |
| B05D 3/12 | (2006.01) | |
| B05D 5/06 | (2006.01) | |
| B29D 11/00 | (2006.01) | |

(52) U.S. Cl. .................. 427/162; 427/264; 427/270; 427/271; 427/277; 427/278; 427/355; 427/374.1; 427/375; 427/385.5; 264/1.1; 264/1.7; 264/1.9

(58) Field of Classification Search ............... 427/162, 427/163.1, 164, 165, 271, 277, 278, 372.2, 427/374.1, 375, 384, 385.5, 389.7, 355, 264, 427/270; 264/1.31, 1.34, 1.1, 1.9, 1.7; 349/67, 349/113
See application file for complete search history.

(56) References Cited

U.S. PATENT DOCUMENTS

| | | | | |
|---|---|---|---|---|
| 4,486,363 A | * | 12/1984 | Pricone et al. ............. 264/1.36 |
| 5,338,782 A | * | 8/1994 | Corley ....................... 523/466 |
| 5,759,616 A | * | 6/1998 | Michel et al. ................ 427/96 |
| 5,817,242 A | * | 10/1998 | Biebuyck et al. ............ 216/41 |
| 6,075,652 A | * | 6/2000 | Ono et al. ................... 359/642 |

(Continued)

FOREIGN PATENT DOCUMENTS

JP         63-042775 A  *  2/1988

(Continued)

OTHER PUBLICATIONS

Patent Abstracts of Japan, Publication No. 04-296820, Publication date Oct. 21, 1992, 2 pages.

(Continued)

Primary Examiner—Timothy Meeks
Assistant Examiner—Wesley D. Markham
(74) Attorney, Agent, or Firm—Osha Liang LLP

(57) ABSTRACT

A method for manufacturing an optical device is disclosed. The method includes coating a substrate with a resin thin layer, wherein temperature of the resin thin layer is controlled lower than a polymerization reaction starting temperature thereof and the resin is not substantially polymerized, heating the resin thin layer to a temperature higher than polymerization reaction starting temperature and glass-transition temperature but lower than a thermal decomposition starting temperature of the resin so that the resin thin layer is polymerized on the substrate to form a resin thin film thereon, pressing a stamp having an inverted micro-asperity pattern against the resin thin film such that a micro-asperity pattern is formed on a surface of the resin thin film; cooling the resin thin film to a temperature lower than the glass-transition temperature; and separating the stamp from the resin thin film.

3 Claims, 16 Drawing Sheets

U.S. PATENT DOCUMENTS

| | | | |
|---|---|---|---|
| 6,228,463 B1 * | 5/2001 | Chen et al. | 428/160 |
| 6,429,919 B1 * | 8/2002 | Takatsuka et al. | 349/113 |
| 2002/0054259 A1 * | 5/2002 | Funahata et al. | 349/113 |

FOREIGN PATENT DOCUMENTS

| | | | |
|---|---|---|---|
| JP | 63-269347 A | * | 11/1988 |
| JP | 03-149803 A | * | 6/1991 |

OTHER PUBLICATIONS

Patent Abstracts of Japan, Publication No. 05-080335, Publication date Apr. 2, 1993, 3 pages.

* cited by examiner

MANUFACTURING METHODS AND APPARATUSES OF AN OPTICAL DEVICE AND A REFLECTION PLATE PROVIDED WITH A RESIN THIN FILM HAVING A MICRO-ASPERITY PATTERN

BACKGROUND OF THE INVENTION

The present invention relates to manufacturing methods and apparatuses of an optical device and a reflection plate each of which is provided with a resin thin film having a micro-asperity pattern.

In this specification, "micro-asperity pattern" is a generic term of asperity shapes that develop one-dimensionally or two-dimensionally and is 0.1 µm to hundreds of micrometers in depth and arbitrary in width, length, and shape. And "reflection-type liquid crystal display device" is a generic term of devices in which a liquid crystal is sealed between a transparent counter substrate having a transparent electrode and an active matrix substrate having a reflection surface that is provided with a surface micro-asperity pattern.

Nowadays, liquid crystal display devices are increasingly applied to personal computers, TV receivers, word processors, video equipment, etc. On the other hand, to increase the functionality and reduce the size, power consumption, cost, etc. of such electronic equipment, reflection-type liquid crystal display devices are being developed that display an image by reflecting external light instead of using a backlight.

FIG. 19 shows an example of such reflection-type liquid crystal display devices. A reflection plate 1 is disposed under a counter substrate 28 that is composed of a transparent electrode facing a liquid crystal layer 27, a color filter layer formed over the transparent electrode, a surface glass substrate disposed over the color filter layer, and other members. The reflection plate 1 is used to increase the viewing angle of image display of the liquid crystal display device by diffuse-reflecting light coming from the counter substrate 28.

As shown in FIG. 20, the reflection plate used in this liquid crystal display device is formed in the following manner. A resin thin film 4 is formed by applying, by spin coating or the like, resin in which polymerization reaction has almost completed to the surface of a substrate 5 made of glass or resin or the surface of a structure in which TFT transistors, liquid crystal driving elements, etc. are formed on such a substrate. The resin thin film 4 is melted by heating it and a micro-asperity pattern stamper 33 is pressed against the resin thin film 4 that is formed on the substrate 5, whereby a micro-asperity pattern is formed.

However, when polymerized resin in which polymerization reaction has almost completed is melted, resulting flowability is low and a stress variation is caused in the thin film 4 by the pressing with the stamper 33. Internal stress develops as the thin film 4 is set thermally. As shown in FIG. 19, in the reflection plate 1, an alignment film (insulating film) 36 needs to be formed on the top surface of a reflection film 26. To this end, baking needs to be performed at about 200° C.

The alignment film 36 is necessary to control liquid crystal molecules so that they have an arrangement and an inclination that are suitable for a liquid crystal operation mode as well as to insulate the reflection film 26 (metal coating) from the liquid crystal layer 27. For example, the alignment film 36 is required to be applied uniformly, be strong enough to endure a rubbing process, exhibit high adhesiveness when brought into contact with an ITO film, TFTs, interconnections, or the like, and be stable when exposed to chemicals used in a cleaning process or subjected to a heat treatment.

Polyimide is used conventionally as a resin material that satisfies that above requirements. Polyimide has high heat resistance (about 300°), is transparent and has a high glass-transition temperature, does not react with liquid crystals, is high in the affinity for liquid crystals, aligns liquid crystals easily, and exhibits high adhesiveness when brought into contact with an ITO film, TFTs, interconnections, or the like.

Therefore, if baking is performed for the alignment film 36 that is made of polyimide which has high heat resistance and a high glass-transition temperature after a micro-asperity pattern was formed by using a resin that has a low glass-transition temperature and low heat resistance and in which polymerization reaction did not complete and then the reflection film 26 was formed, a problem arises that the micro-asperity pattern loses its shape in the baking process.

SUMMARY OF INVENTION

The present invention has been made in view of the above circumstances in the art, and provides a manufacturing method and apparatus of an optical device provided with a resin thin film having a micro-asperity pattern that does not lose its shape through softening of the resin thin film in an alignment film forming process even if the resin thin film is made of polyimide.

The invention further provides manufacturing methods and apparatuses of an optical device and a reflection plate each of which is provided with a resin thin film having a micro-asperity pattern, the manufacturing methods and apparatuses being simplified further in process.

The invention provides a manufacturing method of an optical device, comprising the steps of coating a substrate with a resin thin film having a glass-transition temperature that is higher than 200° C.; controlling a temperature of the resin thin film to a temperature that is higher than the glass-transition temperature of the resin thin film and lower than a thermal decomposition starting temperature of the resin thin film; pressing a die having an inverted micro-asperity pattern against the resin thin film in a state that the temperature of the resin thin film is controlled so as to be higher than the glass-transition temperature and lower than the thermal decomposition starting temperature; and separating the die from the resin thin film after cooling the resin thin film so that the temperature of the resin thin film becomes lower than the glass-transition temperature, whereby a micro-asperity pattern is formed on a surface of the resin thin film.

In this manufacturing method, the die has a member or portion having an inverted shape of the shape of at least a micro-asperity pattern to be formed on the surface of a resin thin film, and may be either a press male die or a roller-type die.

The optical device means a light transmission body provided with a resin thin film whose surface is formed with at least a micro-asperity pattern.

In this manufacturing method, the micro-asperity pattern surface of the die is pressed against the resin thin film, whereby a micro-asperity pattern is formed on the surface of the resin thin film. Therefore, the micro-asperity pattern that is left on the resin thin film is given an arbitrary three-dimensional shape. That is, a micro-asperity pattern can be obtained with a high degree of freedom and high reproducibility.

Since the temperature of the resin thin film formed on the substrate is controlled to a temperature that is higher than the glass-transition temperature and lower than the thermal decomposition starting temperature, there does not occur a phenomenon that the modulus of elasticity of the resin thin film becomes extremely small and stain due to internal stress becomes very large. If the temperature of a material became higher than the glass-transition temperature, the modulus of elasticity of the material would decrease to $1/1,000$ to $1/10,000$ of a value at temperatures lower than the glass-transition temperature. Since a micro-asperity pattern is formed on the resin thin film whose glass-transition temperature is higher than 200° C., the micro-asperity pattern will not lose its shape even if baking is performed at 200° C. at a later alignment film forming step.

The invention also provides a manufacturing method of an optical device, comprising the steps of coating a substrate with a resin thin film in which polymerization reaction has not occurred yet substantially; controlling a temperature of the resin thin film to a temperature that is lower than a polymerization reaction starting temperature of the resin thin film; pressing a die having an inverted micro-asperity pattern against the resin thin film and separating the die from the resin thin film in a state that the temperature of the resin thin film is controlled so as to be lower than the polymerization reaction starting temperature; and heating the resin thin film so that the temperature of the resin thin film becomes higher than the polymerization reaction starting temperature and lower than a glass-transition temperature of the resin thin film, whereby a micro-asperity pattern is formed on a surface of the resin thin film.

In this manufacturing method, a micro-asperity pattern is formed by pressing the die against the resin thin film in which polymerization reaction has not occurred yet substantially. Therefore, there does not occur a phenomenon that stress is distributed in the film when the die is pressed against it and internal stress is accumulated as the film is set. A micro-asperity pattern can be obtained with high reproducibility.

In the above two manufacturing methods, the resin thin film may be of a polyimide (PI) type, a polyamide (PA) type, or a poly(methyl methacrylate) (PMMA) type. It is desirable that the polyimide-type resin be fully aromatic polyimide such as polyimide (PI), polyamideimide (PAI), or polyetherimide (PEI).

In the case of the PI-type resin and the PA-type resin, the glass-transition temperature (i.e., the temperature where the resin starts to become high in flowability, extremely soft, and low in viscosity) is generally higher than or equal to 200° C. and lower than 450° C. and the thermal decomposition starting temperature (i.e., the temperature where a resin thin film characteristics start to deteriorate remarkably as exemplified by loss of composition) is usually higher than or equal to 300° C. The polymerization reaction starting temperature (the thermosetting starting temperature) is higher than or equal to 100° C.

In the case of the PI-type resin, the temperature of the resin thin film when it is pressed is set higher than the glass-transition temperature and lower than the thermal decomposition starting temperature. Since the cooling takes longer time as the press temperature increases, it is desirable that the press temperature be set lower than or equal to the glass-transition temperature plus 10° C.

Micro-asperity patterns can be laid out arbitrarily by executing the die pressing step plural times on the resin thin film.

In the invention, it is an effective measure to make adjustments by causing a relative movement between the substrate and the die so that a substrate-side alignment mark provided on the substrate coincides with a reference position on the die side. With this technical measure, an error in the position of the substrate with respect to the die can be corrected by causing a relative movement between the substrate and the die so that the substrate-side alignment mark provided on the substrate coincides with the reference position on the die side. As a result, a micro-asperity pattern can be formed with high processing accuracy.

In the invention, it is also an effective measure to form a micro-asperity pattern on the surface of the resin thin film in an inert gas atmosphere or a low-pressure atmosphere having a pressure that is lower than atmospheric pressure.

With this technical measure, the air is exhausted in advance from a chamber that accommodates the manufacturing device for manufacturing an optical device. Therefore, oxygen and impurities contained in the air inside the chamber are exhausted and a micro-asperity pattern can be formed in a clean, inert gas atmosphere. This makes it possible to not only prevent the resin thin film from being oxidized or changed in quality but also prevent a phenomenon that impurities stick to the resin thin film during formation of a micro-asperity pattern and are finally fixed to the micro-asperity pattern formed, whereby the production yield of the optical device can be increased.

Particularly where the pressure inside the chamber is lowered, air is no longer trapped between the die and the resin thin film and a micro-asperity pattern that is free of air bubbles can be formed. If air bubbles existed, they would act as a damper and hence necessitate stronger pressing force. Without air bubbles, the pressing force can be made weaker, as a result of which residual stress in a micro-asperity pattern formed decreases. Therefore, the production yield of the optical device can be increased.

According to another aspect of the invention, there is provided a manufacturing apparatus of an optical device, comprising a transfer stage disposed under a die having an inverted micro-asperity pattern, for holding a substrate that is coated with a resin thin film, the transfer stage having heating means for heating the resin thin film; a transfer stage transfer direction moving mechanism for reciprocating the transfer stage between an initial position and a movement end position where a movement that starts from the initial position ends; and a pressurizing mechanism for pressing the die against the resin thin film at a prescribed position, wherein a micro-asperity pattern is formed on a surface of the resin thin film by pressing the die against the resin thin film with the pressurizing mechanism.

In this manufacturing apparatus, the heating means for heating the resin thin film may be provided inside the transfer stage. Alternatively, the resin thin film may be heated by a separated heat radiating means from above the substrate or from sides of the substrate.

The transfer stage transfer direction moving mechanism is a mechanism for moving the transfer stage that holds the substrate rightward from the initial position to the movement end position (it is assumed that the initial position is located on the left side) while a micro-asperity pattern is formed on the resin thin film, and for returning the transfer stage from the movement end position to the initial position. As mentioned above, the die may be either a press male die or a roller-type die.

In this manufacturing apparatus, the die is pressed against the resin thin film while the substrate on the transfer stage is moved from the initial position to the movement end position, whereby a micro-asperity pattern is formed. Therefore, an optical device having a micro-asperity pattern that has been formed with high processing accuracy can be provided.

The invention also provides a manufacturing apparatus of an optical device, comprising a transfer stage disposed under a die having an inverted micro-asperity pattern, for holding a substrate that is coated with a resin thin film, the transfer stage having heating means for heating the resin thin film; a pressurizing mechanism for pressing the die against the resin thin film at a prescribed position; and a pressurizing mechanism transfer direction moving mechanism for reciprocating the pressurizing mechanism between an initial position and a movement end position where a movement that starts from the initial position ends, wherein a micro-asperity pattern is formed on a surface of the resin thin film by pressing the die against the resin thin film with the pressurizing mechanism.

The pressurizing mechanism transfer direction moving mechanism is a mechanism for moving the pressurizing mechanism on the resin thin film rightward from the initial position to the movement end position (it is assumed that the initial position is located on the left side) while a micro-asperity pattern is formed on the resin thin film, and for returning the pressurizing mechanism from the movement end position to the initial position. As mentioned above, the die may be either a press male die or a roller-type die. The heating means for heating the resin thin film may be provided inside the transfer stage. Alternatively, the resin thin film may be heated by a separated heat radiating means from above the substrate or from sides of the substrate.

In this manufacturing apparatus, the die is pressed against the resin thin film while the pressurizing mechanism is moved from the initial position to the movement end position, whereby a micro-asperity pattern is formed. Therefore, an optical device having a micro-asperity pattern that has been formed with high processing accuracy can be provided.

It is desirable that the die incorporate heating means. With this technical measure, by heating the die to approximately the same temperature as a temperature of the resin thin film, the resin thin film being heated is not cooled by the die. As a result, the cycle time of a manufacturing process can be made constant and an optical device having a micro-asperity pattern that has been formed with high processing accuracy can be provided.

It is desirable that the apparatus be configured in such a manner that the substrate is disposed under the die so as to be able to move in an X direction and a Y direction and rotate about a Z axis, whereby the position of the substrate can be adjusted with respect to the die. With this technical measure, since the substrate can be moved in the X axis and the Y axis with respect to the die and can be rotated about the Z axis, the position of the substrate with respect to the die can be adjusted. Therefore, an optical device that has been manufactured with high processing accuracy can be provided.

In the invention, it is an effective measure to give the die a cylindrical shape in which the outer circumferential surface is formed with the inverted micro-asperity pattern, and to form a micro-asperity pattern on the surface of the resin thin film as the die rolls on the surface of the resin thin film while being pressed against the resin thin film.

With this technical measure, a micro-asperity pattern is formed as the cylindrical die whose outer circumferential surface is formed with the inverted micro-asperity pattern is pressed against the resin thin film. Therefore, even if air bubbles exist inside the resin thin film, they are pushed and moved by the recesses of the inverted micro-asperity pattern of the die in the direction opposite to the movement direction of the resin thin film (in the case where the resin thin film is moving) or the movement direction of the die (in the case where the die is moving) and are broken by the projections of inverted micro-asperity pattern, whereupon the air goes out of the resin thin film. This reduces the probability of a phenomenon that a micro-asperity pattern produced is deformed by air bubbles remained inside the resin thin film, as a result of which the yield is increased.

In the invention, it is an effective measure to employ a transfer stage crossing direction moving mechanism for moving the transfer stage in a crossing direction that crosses a micro-asperity pattern transfer direction, whereby a relative movement can be caused between the resin thin film and the die in each of the micro-asperity pattern transfer direction and the crossing direction.

A micro-asperity pattern is transferred to the resin thin film by means of the die. If the position of the substrate that is provided on the transfer stage is deviated from the reference position of the die, a micro-asperity pattern is not formed at a prescribed position. It is therefore necessary to move the transfer stage perpendicularly to the die movement direction. The transfer stage crossing direction moving mechanism is provided for this purpose. Although it is desirable to move the transfer stage completely perpendicularly to the micro-asperity pattern transfer direction, high-level techniques are needed to do so because of manufacturing errors. The transfer stage need not always be moved completely perpendicularly to the micro-asperity pattern transfer direction.

With this technical measure, the initial position of the substrate that is held by the transfer stage can be adjusted by causing a relative movement between the transfer stage and the die in the micro-asperity pattern transfer direction and the crossing direction by using the transfer stage crossing direction moving mechanism and the transfer stage transfer direction moving mechanism for reciprocating the transfer stage between the initial position and the movement end position or the pressurizing mechanism transfer direction moving mechanism for reciprocating the pressurizing mechanism between the initial position and the movement end position. Another mode of operation is possible that after a first micro-asperity pattern is formed by the die, the transfer stage is moved by the transfer stage crossing direction moving mechanism and a second micro-asperity pattern is formed beside the first one.

In the invention, it is effective that the die comprise a stamper to be pressed against the resin thin film to form a micro-asperity pattern on its surface, a base for holding the stamper, and an elastic member interposed between the stamper and the base.

With this technical measure, the elastic member absorbs manufacturing errors such as undulation in the stamper and the base, whereby the micro-asperity pattern processing accuracy can be increased.

It is also effective that the die comprise an embossment roll member to be pressed against the resin thin film to form a micro-asperity pattern on its surface, a roll body for holding rotatably the embossment roll member, and an elastic member interposed between the embossment roll member and the roll body.

With this technical measure, the elastic member absorbs manufacturing errors such as undulation in the embossment roll member and the roll body, whereby the micro-asperity pattern processing accuracy can be increased.

In the invention, it is effective that the pressurizing mechanism comprise at least one alignment mark observation optical device so that at least one alignment mark provided on the substrate can be recognized visually.

It is also an effective measure to employ at least one alignment mark observation optical device that is disposed under the substrate so that at least one pair of a first alignment mark provided on the substrate and a second alignment mark provided on the die can be recognized visually. As long as the alignment mark observation optical device is disposed under the substrate, it may be provided inside the transfer stage or the above-mentioned rotation moving mechanism or may bridge the transfer stage and the rotation moving mechanism.

This technical measure makes it possible to form a micro-asperity pattern having high positional accuracy.

The invention also provides a manufacturing apparatus of an optical device, comprising a transfer stage for holding a substrate that is coated with a resin thin film; a die having an inverted micro-asperity pattern; a pressurizing mechanism for pressing the die against the resin thin film at a prescribed position; a moving mechanism for moving one of the transfer stage and the die while the die is pressed against the resin thin film; heating means for heating the substrate; an airtight chamber for accommodating at least the transfer stage, the die, the pressurizing mechanism, the moving mechanism, and the heating means; and exhausting means for exhausting a gas from the airtight chamber prior to an operation that a micro-asperity pattern is formed on a surface of the resin thin film by pressing the die against the resin thin film.

In this manufacturing apparatus, the exhausting means for exhausting a gas from the airtight chamber prior to an operation that a micro-asperity pattern is formed on the surface of the resin thin film by pressing the die against the resin thin film. Therefore, oxygen and impurities contained in the air inside the airtight chamber are exhausted and a micro-asperity pattern can be formed in a clean, inert gas atmosphere. This makes it possible to not only prevent the resin thin film from being oxidized or changed in quality but also prevent a phenomenon that impurities stick to the resin thin film during formation of a micro-asperity pattern and are finally fixed to the micro-asperity pattern formed, whereby the production yield of an optical device can be increased.

According to another aspect of the invention, there is provided a manufacturing method of a reflection plate, comprising the steps of forming thin-film liquid crystal driving elements or wiring contacts on a substrate; coating the substrate with a resin thin film having a glass-transition temperature that is higher than 200° C.; controlling a temperature of the resin thin film to a temperature that is higher than the glass-transition temperature of the resin thin film and lower than a thermal decomposition starting temperature of the resin thin film; pressing a die having an inverted micro-asperity pattern against the resin thin film in a state that the temperature of the resin thin film is controlled so as to be higher than the glass-transition temperature and lower than the thermal decomposition starting temperature; separating the die from the resin thin film after cooling the resin thin film so that the temperature of the resin thin film becomes lower than the glass-transition temperature; heating the resin substrate so that the temperature of the resin thin film becomes higher than or equal to a polymerization reaction starting temperature of the resin thin film, whereby a micro-asperity pattern is formed on a surface of the resin thin film; and forming a reflection film and an alignment film on the micro-asperity pattern.

In this manufacturing method, since the temperature of the resin thin film formed on the substrate is controlled to a temperature that is higher than 200° C. and lower than the glass-transition temperature, there does not occur a phenomenon that the modulus of elasticity of the resin thin film becomes extremely small and stain due to internal stress becomes very large.

Since a reflection film and an alignment film are formed on a micro-asperity pattern after the die was separated after cooling the resin thin film so that its temperature became lower than the glass-transfer temperature and the resin thin film was baked at a temperature higher than or equal to the polymerization reaction starting temperature (e.g., 230° C.), the micro-asperity pattern does not lose its shape even if baking is performed at 200° C. at the alignment film forming step.

The invention also provides a manufacturing method of a reflection plate, comprising the steps of forming thin-film liquid crystal driving elements or wiring contacts on a substrate; coating the substrate with a resin thin film in which polymerization reaction has not occurred yet substantially; controlling a temperature of the resin thin film to a temperature that is lower than a polymerization reaction starting temperature of the resin thin film; pressing a die having an inverted micro-asperity pattern against the resin thin film in a state that the temperature of the resin thin film is controlled so as to be lower than the polymerization reaction starting temperature; separating the die from the resin thin film; heating the resin thin film so that the temperature of the resin thin film becomes higher than the polymerization reaction starting temperature and lower than a glass-transition temperature of the resin thin film, whereby a micro-asperity pattern is formed on a surface of the resin thin film; and forming a reflection film and an alignment film on the micro-asperity pattern.

In this manufacturing method, since a micro-asperity pattern is formed in a state that the temperature of the resin thin film that is formed on the substrate is controlled so as to be lower than the polymerization reaction starting temperature, no polymerization reaction occurs in forming the micro-asperity pattern. Further, the modulus of elasticity is not so low and the flowability is not so high that the micro-asperity pattern loses its shape when the stamper is separated from it. Therefore, a cooling step is not needed.

Since the resin thin film is baked at a temperature that is higher than its polymerization reaction starting temperature and lower than its glass-transition temperature, no polymerization reaction occurs at this stage. Therefore, a micro-asperity pattern does not lose its shape when baking is performed at 200° C. at the later alignment film forming step.

DETAILED DESCRIPTION

Preferred embodiments of the present invention will be hereinafter described in detail with reference to the accompanying drawings. The dimensions, materials, shapes, relative arrangements, etc. of components used in the embodiments are just examples and are not intended to restrict the scope of the invention unless there is a specific statement to the contrary.

FIGS. 1A–1G illustrate micro-asperity pattern forming methods according to embodiments of the invention for forming a micro-asperity pattern on a resin thin film. First, a first method will be described with reference to FIGS. 1A–1G.

Figure 1A:
FIGS. 1A–1G illustrate micro-asperity pattern forming methods according to embodiments of the invention for forming a micro-asperity pattern on a resin thin film.

As shown in FIG. 1A, liquid crystal driving elements (TFTs) or wiring contacts 31 are already formed on a glass substrate 5. The wiring contacts 31 were formed by repeating steps of forming a metal, insulator, or semiconductor thin film on the glass substrate 5 by sputtering, CVD, or the like, coating the thin film with a resist by spin coating, setting the resist by baking it at a high temperature, exposing the resist to ultraviolet light through a proper mask, removing exposed portions of the resist with a developer, again performing baking at a high temperature, etching away uncovered portions of the thin film, and removing the remaining portions of the resist with a remover.

As shown in FIG. 1A, a resin thin film 4 of a thermoplastic resin such as polyimide (PI) is formed on the glass substrate 5 by spin coating. In this state, polymerization reaction has not occurred yet.

Figure 1B:

As shown in FIG. 1B, heating is performed at a temperature (e.g., 360° C.) that is higher than the polymerization reaction starting temperature and the glass-transition temperature and lower than the thermal decomposition starting temperature (desirably lower than or equal to the glass-transition temperature plus 10° C.), whereby the resin thin film 4 is polymerized and softened.

Figure 1C:
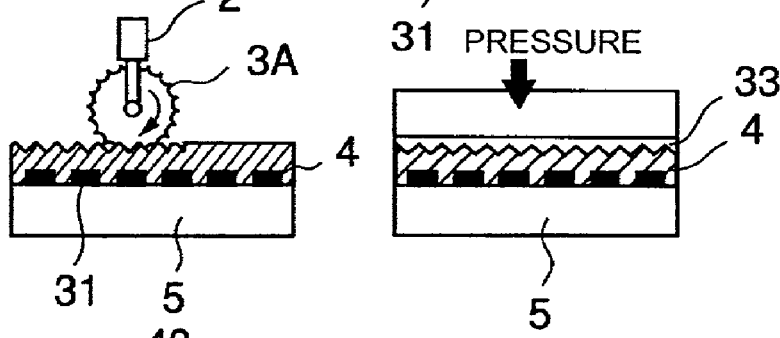

In this state, as shown in FIG. 1C, a stamper 33 is pressed against the soft resin thin film 4 from above or an embossment roll 3A is rolled while being pressed against the soft resin thin film 4 from above. Then, the resin thin film 4 is cooled to a temperature (e.g., lower than 350° C.) lower than the glass-transition temperature.

Figure 1D:
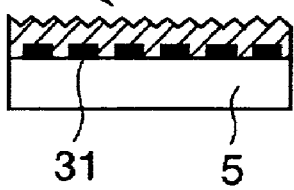

As shown in FIG. 1D, the stamper 33 is removed to leave, on the surface of the resin thin film 4, a transferred micro-asperity pattern 40 which is an inverted pattern of the pattern of the stamper 33.

The material of the resin thin film 4 may be polyimide PIX-1400 (product type name) of Hitachi Chemical DuPont Co., Ltd., which is a thermoplastic resin having a glass-transition temperature of 350° C., a thermal decomposition starting temperature of 450° C. and a polymerization reaction starting temperature that is lower than the glass-transition temperature.

Figure 1E:
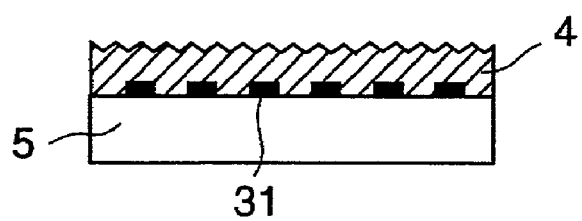
Figure 1F:
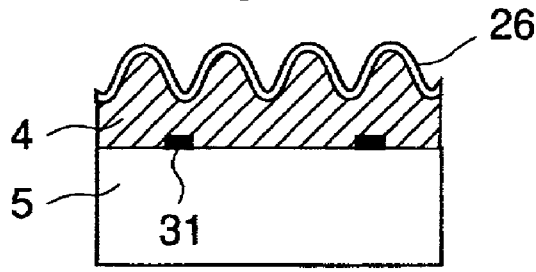
Figure 1G:
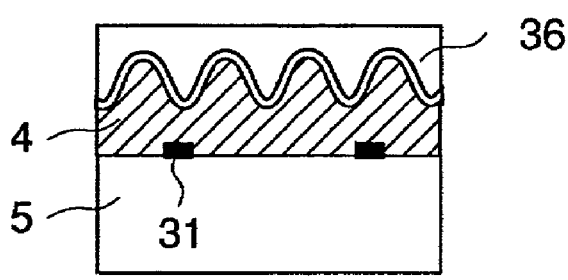

Then, as shown in FIG. 1F, a metal thin film of Ag, Al, or the like is deposited as a reflection film 26 on the pattern 40 of the resin thin film 4 by sputtering. As shown in FIG. 1G, the reflection film 26 is coated with a polyimide insulating film 36 and baking is performed at 200° C. to stabilize the insulating film 36. A reflection plate 1 is thus completed.

In the first method, the resin thin film 4 is made of polyimide whose glass-transition temperature is higher than 200° C. and baking is performed at 200° C. to form the insulating film 36 on the reflection film 26. Therefore, it can be prevented that the micro-asperity pattern 40 loses its shape in this baking step due to residual stress that occurred in the embossment step.

Next, a second method for forming a micro-asperity pattern on a resin thin film will be described with reference to FIGS. 1A–1G. The second method is different from the first methods in the following points. Whereas in the first method the resin thin film 4 is polymerized and softened by heating it at a temperature that is higher than the polymerization reaction starting temperature and the glass-transition temperature and lower than the thermal decomposition starting temperature (desirably lower than or equal to the glass-transition temperature plus 10° C.) and a micro-asperity pattern 40 is formed by using the stamper 33 or the embossment roll 3A, in the second method the resin film is polymerized at a temperature that is higher than the polymerization reaction starting temperature and lower than the glass-transition temperature after a micro-asperity pattern 40 is formed by using the stamper 33 or the embossment roll 3A at a temperature lower than the polymerization reaction starting temperature. Whereas in the first method the cooling step is needed after the embossment step of forming a micro-asperity pattern 40 on the resin thin film 4 by using the stamper 33 or the embossment roll 3A, in the second method the cooling step is omitted.

Although the first method uses a thermoplastic resin, in the second embodiment the material of the resin thin film 4 is not limited to a thermoplastic resin and a thermosetting resin such as thermosetting polyamide PIS 5001 (product type name) of Chisso Corporation may be used, which has a polymerization reaction starting temperature of 120° C., a thermal decomposition starting temperature of 450° C., a glass-transition temperature that is higher than the thermal decomposition starting temperature.

The step of FIG. 1A is the same as in the first method. In the state that the resin thin film 4 made of a thermosetting resin such as polyamide (PA) is formed on the glass substrate 5 (spin coating was employed), polymerization reaction has not occurred yet or has occurred only at a small extent. In this state, being composed of almost only molecules that constitute the resin material, and the resin thin film 4 is flowable even in the solid phase and has a small modulus of elasticity.

As shown in FIG. 1B, the resin thin film 4 is pre-baked for 3–10 minutes at a temperature (e.g., 110° C.) that is lower than the thermosetting starting temperature (polymerization reaction starting temperature), whereby a solvent is volatilized.

The step of FIG. 1C is the same as in the first step in that the stamper 33 is pressed against the soft resin thin film 4 from above or the embossment roll 3A is rolled while being pressed against the soft resin thin film 4 from above.

In this state, the resin thin film 4 has such a large modulus of elasticity and a low degree of flowability as to be able to hold a transferred shape.

As shown in FIG. 1D, when the stamper 33 is removed at a temperature that is lower than the polymerization reaction starting temperature (lower than 120° C.), a transferred micro-asperity pattern 40 which is an inverted pattern of the pattern of the stamper 33 is left on the surface of the resin thin film 4. Then, as shown in FIG. 1E, the resin thin film 4 is baked at 210° C. that is higher than the polymerization reaction starting temperature (120° C.) and the temperature (200° C.) at which an alignment film (insulating film) 36 will be formed at the step of FIG. 1G and lower than the glass-transition temperature, whereby the film quality is stabilized.

The reflection film forming step of FIG. 1F and the alignment film (insulating film) forming step of FIG. 1G are the same as in the first embodiment.

In the second embodiment, the prebaking and the embossment are performed at a temperature lower than the polymerization reaction starting temperature. Since in this state the modulus of elasticity is large and the flowability is low, the transferred shape of the micro-asperity pattern 40 is maintained even if the stamper 30 is removed without cooling the resin thin film 4 after the embossment. After the embossment, baking is performed at a temperature that is higher than the polymerization reaction starting temperature of the resin material and lower than its glass-transition temperature, whereby polymerization reaction occurs and the resin thin film 4 thereby makes a transition to a state that the modulus of elasticity is large and the flowability is low. Therefore, although heating is performed at 200° C. in forming an insulating film 36, the micro-asperity pattern 40 does not lose its shape in this step.

Figure 2:
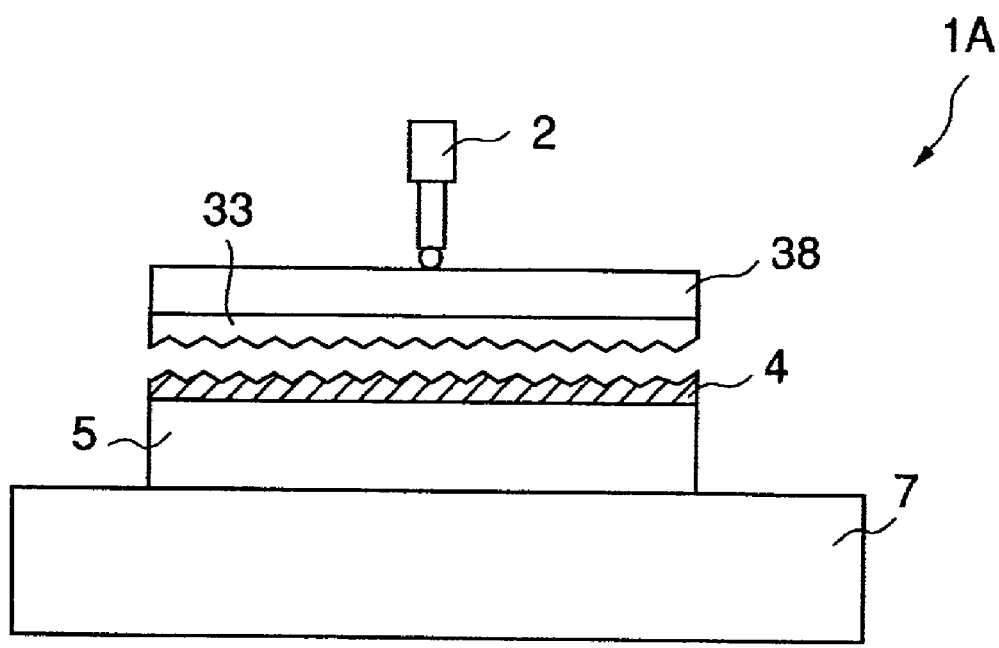
FIG. 2 illustrates the main part of a micro-asperity pattern forming apparatus according to a first embodiment of the invention for forming a micro-asperity pattern on a resin thin film.

FIG. 2 illustrates the main part of a micro-asperity pattern forming apparatus 1A according to a first embodiment of the invention for forming a micro-asperity pattern on a resin thin film.

In FIG. 2, polished on both sides, an opaque or transparent substrate 5 made of ceramics, glass, plastics, aluminum-molybdenum, silicon, or the like has prescribed levels of undulation, warping, and flatness. Warping of 1 mm or less is allowable. The undulation is so set to be less than tens of microns for 10 mm period. And the flatness is so set tens of nanometers for 10 μm period. The substrate 5 may be one on which electronic devices such as liquid crystal driving elements are arranged in array form.

A resin thin film 4 made of polyimide (PI), polyamide (PA), polyamideimide (PAI), polyetherimide (PEI), poly (methyl methacrylate) (PMMA), or the like is formed on the substrate 5 at a thickness of about 0.1–100 μm (spin coating was employed). A stamper 33, which is disposed above the resin thin film 4, is made of a metal material such as Ni, Al, SUS, or Cu, ceramics, glass, silicon, resin, or the like. The stamper 33 may be produced by forming an asperity pattern on the surface of a plate member by direct carving, etching, printing, or the like. The material of the resin thin film 4 is not limited to the ones mentioned above; for example, a novolac resin and a phenol resin may be used.

The stamper 33 is fixed to a base 38. The stamper 33 for press-shaping the resin thin film 4 is held by a pressurizing mechanism 2. The apparatus is so configured that the pressurizing mechanism 2 can produce pressure of several megapascals to thousands of megapascals. The pressurizing mechanism 2 produces pressure using a hydraulic mechanism. Alternatively, a pneumatic mechanism, reaction force of a high-elasticity spring, restoring force of a shape memory alloy, or the like may be used.

The substrate 5 is vacuum-absorbed on a transfer stage 7. Alternatively, the substrate 5 may be held by electrostatic absorption or by some other holding means.

In the apparatus according to the first embodiment that is configured as described above, the asperity pattern of the stamper 33 is pressed against the resin thin film 4 by the pressurizing mechanism 2 in the state that the substrate 5 is held by the transfer stage 7, whereby a micro-asperity pattern is formed on the top surface of the resin thin film 4.

Figure 3:
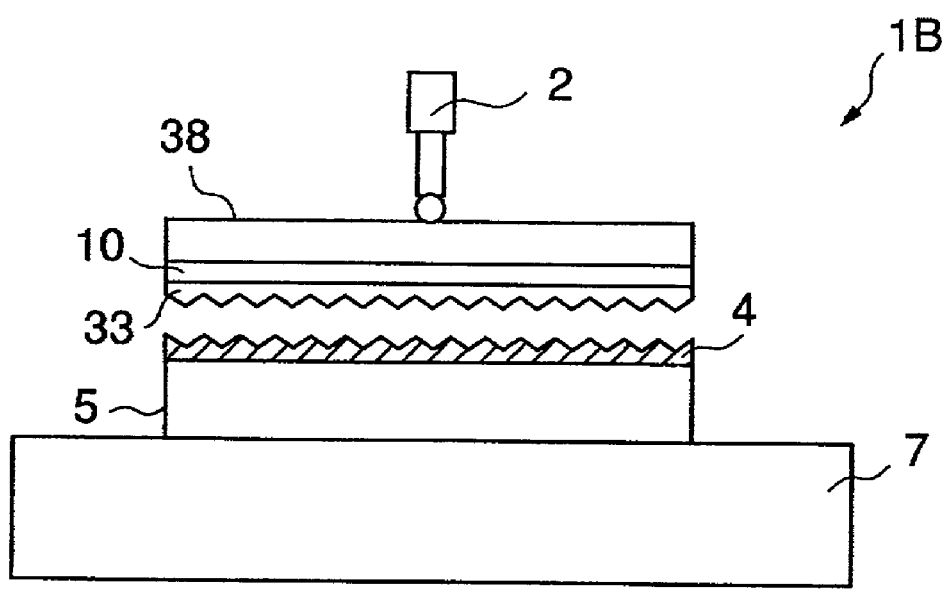
FIG. 3 illustrates the main part of a micro-asperity pattern forming apparatus according to a second embodiment of the invention for forming a micro-asperity pattern on a resin thin film.

FIG. 3 illustrates the main part of a micro-asperity pattern forming apparatus 1B according to a second embodiment of the invention for forming a micro-asperity pattern on a resin thin film. The apparatus of FIG. 3 is different from the apparatus of FIG. 2 in that in the former apparatus an elastic body 10 made of synthetic rubber, a corrugated metal sheet, or a combination thereof is interposed between the base 38 and the stamper 33. This apparatus can manufacture optical device products having accurate dimensions by absorbing manufacturing errors such as undulation, if any, of the base 38, the stamper 33, etc.

Figure 4:
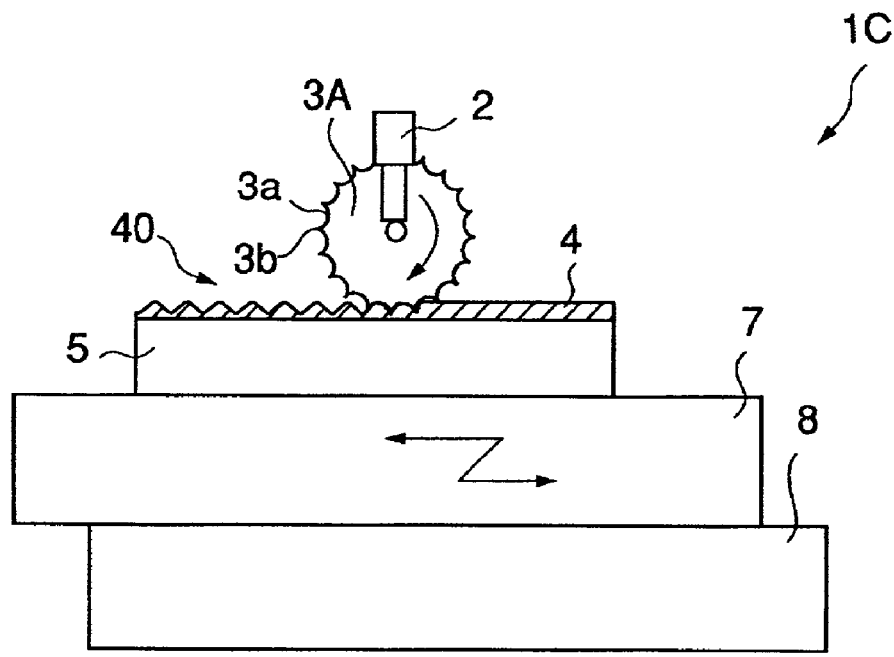
FIG. 4 illustrates the main part of a micro-asperity pattern forming apparatus according to a third embodiment of the invention for forming a micro-asperity pattern on a resin thin film.

FIG. 4 illustrates the main part of a micro-asperity pattern forming apparatus 1C according to a third embodiment of the invention for forming a micro-asperity pattern on a resin thin film. The apparatus of FIG. 4 is different from the apparatus of FIG. 2 in that the former uses a cylindrical embossment roll 3A.

The embossment roll 3A for press-shaping the resin thin film 4 is held rotatably by the pressurizing mechanism 2. The apparatus is so configured that the pressurizing mechanism 2 can produce pressure of several megapascals to thousands of megapascals. The pressurizing mechanism 2 produces pressure using a hydraulic mechanism. Alternatively, a pneumatic mechanism, reaction force of a high-elasticity spring, restoring force of a shape memory alloy, or the like may be used.

The transfer stage 7 can be moved in the right-left direction on a moving mechanism 8A by a linear actuator that is provided in the moving mechanism 8. Instead of the linear actuator, a hydraulic cylinder, a pneumatic cylinder, or a combination of a motor and a chain (or a belt) may be used.

In the apparatus according to the third embodiment that is configured as described above, when the substrate 5 is moved right to left in FIG. 2 in the state that it is held by the transfer stage 7, the embossment roll 3A is rotated clockwise while the asperity pattern of the embossment roll 3A is pressed against the resin thin film 4 by the pressurizing mechanism 2, whereby an asperity pattern 40 is formed on the top surface of the resin thin film 4. In the third embodiment, it goes without saying that the embossment roll 3A, rather than the resin thin film 4, may be moved from one side to the other.

In the third embodiment, the embossment roll 3A (specifically, its recesses 3a) is pressed against the surface of the resin thin film 4. Therefore, even if air bubbles exist inside the resin thin film 4, they are pushed and moved by the recesses 3a of the embossment roll 3A in the direction opposite to the movement direction of the resin thin film 4 and are broken by projections 3b of the embossment roll 3A, whereupon the air goes out of the resin thin film 4. This reduces the probability of a phenomenon that a resulting micro-asperity pattern 40 is deformed by air bubbles.

Figure 5:
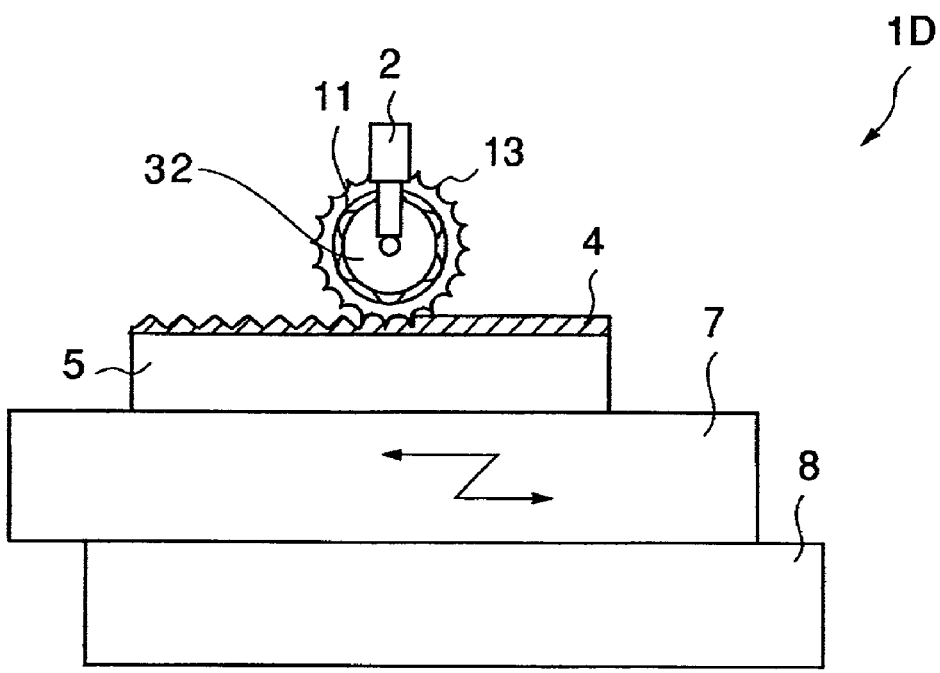
FIG. 5 illustrates the main part of a micro-asperity pattern forming apparatus according to a fourth embodiment of the invention for forming a micro-asperity pattern on a resin thin film.

FIG. 5 illustrates the main part of a micro-asperity pattern forming apparatus 1D according to a fourth embodiment of the invention for forming a micro-asperity pattern on a resin thin film. The apparatus of FIG. 5 is different from the apparatus of FIG. 4 (third embodiment) in the structure of the embossment roll. Specifically, in this embodiment, a cylindrical roll body 32 to engage the pressurizing mechanism 2 is provided and an elastic member that is a thin plate 11 made of metal or resin is interposed between the roll body 32 and an embossment roll member 13. Instead of the thin plate 11, resin or synthetic rubber may be interposed between the roll body 32 and the embossment roll member 13. As a further alternative, a damper structure in which liquid or gel is sealed may be used.

According to this embodiment, since the elastic member is interposed between the roll body 32 and the embossment roll member 13, manufacturing errors such as undulation, if any, of the embossment roll member 13, the roll body 32, etc. are absorbed, whereby optical device products having accurate dimensions can be manufactured.

Figure 6:
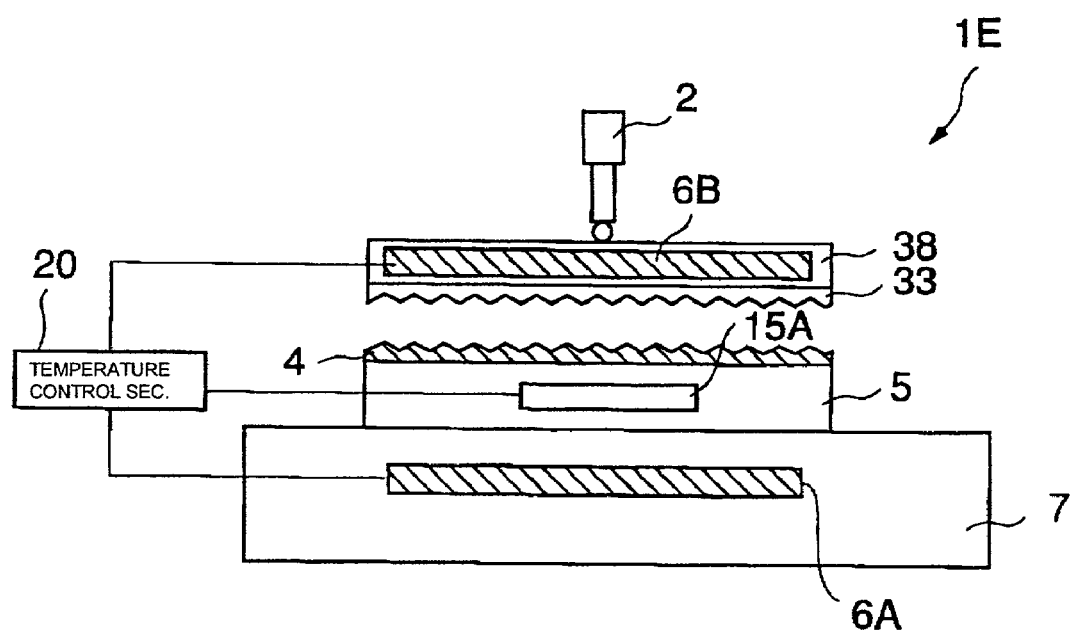
FIG. 6 illustrates the main part of a micro-asperity pattern forming apparatus according to a fifth embodiment of the invention for forming a micro-asperity pattern on a resin thin film.

FIG. 6 illustrates the main part of a micro-asperity pattern forming apparatus 1E according to a fifth embodiment of the invention for forming an asperity pattern on a resin thin film. The fifth embodiment is different from the first embodiment of FIG. 2 in that heater units 6B and 6A are provided inside the base 38 and the transfer stage 7, respectively, so that the temperature of the resin thin film 4 can be controlled.

The stamper 33 is fixed to the base 38, and the heater unit 6B is provided inside the base 38 in such a manner as to be able to heat the stamper 33 in approximately all the area of the micro-asperity pattern.

The heater unit 6A is provided inside the transfer stage 7 in such a manner as to be able to heat the substrate 5 in approximately all the area. Temperature sensors 15A are provided around the substrate 5. It is preferable that a plurality of temperature sensors 15A be disposed around the substrate 5 and control be made based on an average value of temperatures at the locations of the respective temperature sensors 15A.

The system is configured in such a manner that the temperatures of the heater units 6A and 6B can be controlled to prescribed values by a temperature control section 20 based on temperature information supplied from the temperature sensors 15A that are provided around the substrate 5.

In the apparatus according to the fifth embodiment that is configured as described above, the asperity pattern of the stamper 33 is pressed against the resin thin film 4 by the pressurizing mechanism 2 in the state that the substrate 5 is held by the transfer stage 7, whereby a micro-asperity pattern is formed on the top surface of the resin thin film 4.

In the fifth embodiment, since the temperature of the resin thin film 4 is controlled based on temperature information supplied from the temperature sensors 15A that are provided around the substrate 5, optical device products having accurate micro-asperity patterns can be manufactured.

Figure 7:
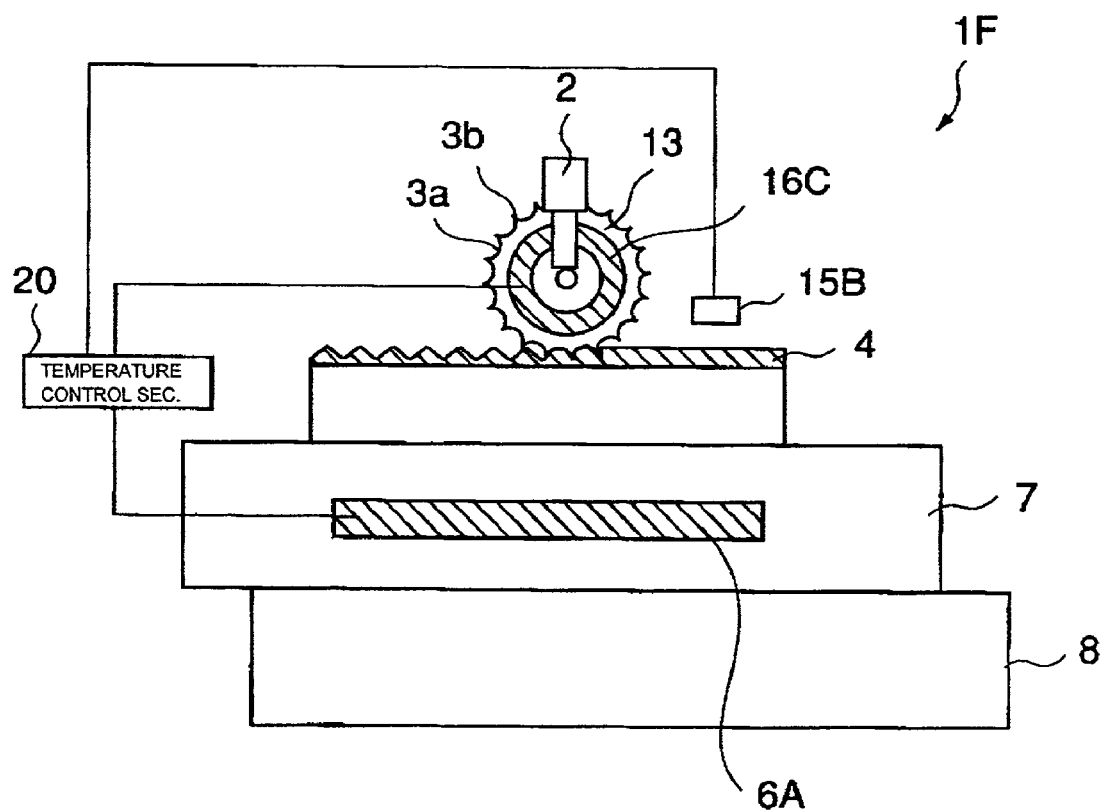
FIG. 7 illustrates the main part of a micro-asperity pattern forming apparatus according to a sixth embodiment of the invention for forming a micro-asperity pattern on a resin thin film.

FIG. 7 illustrates the main part of a micro-asperity pattern forming apparatus 1F according to a sixth embodiment for forming an asperity pattern on a resin thin film. The sixth embodiment is different from the third embodiment of FIG. 4 in that heater units 16C and 6A are provided inside a cylindrical embossment roll member 13 and the transfer stage 7, respectively, and can be controlled by a temperature control section 20, whereby the resin thin film 4 is heated while the embossment roll member 13 is pressed against it.

In the sixth embodiment, the heater unit 16C is provided inside the embossment roll member 13 so as to be able to heat the embossment roll member 13 from inside and the heater unit 6A is provided inside the transfer stage 7. The heater units 16C and 6A are controlled by the temperature control section 20 based on a detected temperature of a temperature sensor 15B. The heaters of the heater units 16C and 6A may be a heating wire heater, a high-power lamp, a ceramic heater, or the like. Control is so made that the heater units 16C and 6A give a uniform temperature distribution to the resin thin film 4.

Although not shown in FIG. 7, heat insulating materials for heat insulation from the heater units 16C and 6A are used in the transfer stage 7, the embossment roll member 13, the pressurizing mechanism 2, and the moving mechanism 8 and a cooling mechanism of a water-cooling type, an air-cooling type, or the like is also provided.

In the sixth embodiment, the embossment roll member 13 (specifically, its recesses 3a) is pressed against the surface of the resin thin film 4. Therefore, even if air bubbles exist inside the resin thin film 4, they are pushed and moved by the recesses 3a of the embossment roll member 13 in the direction opposite to the movement direction of the resin thin film 4 and are broken by projections 3b of the embossment roll member 13, whereupon the air goes out of the resin thin film 4. This reduces the probability of a phenomenon that a resulting micro-asperity pattern is deformed by air bubbles.

Figure 8:
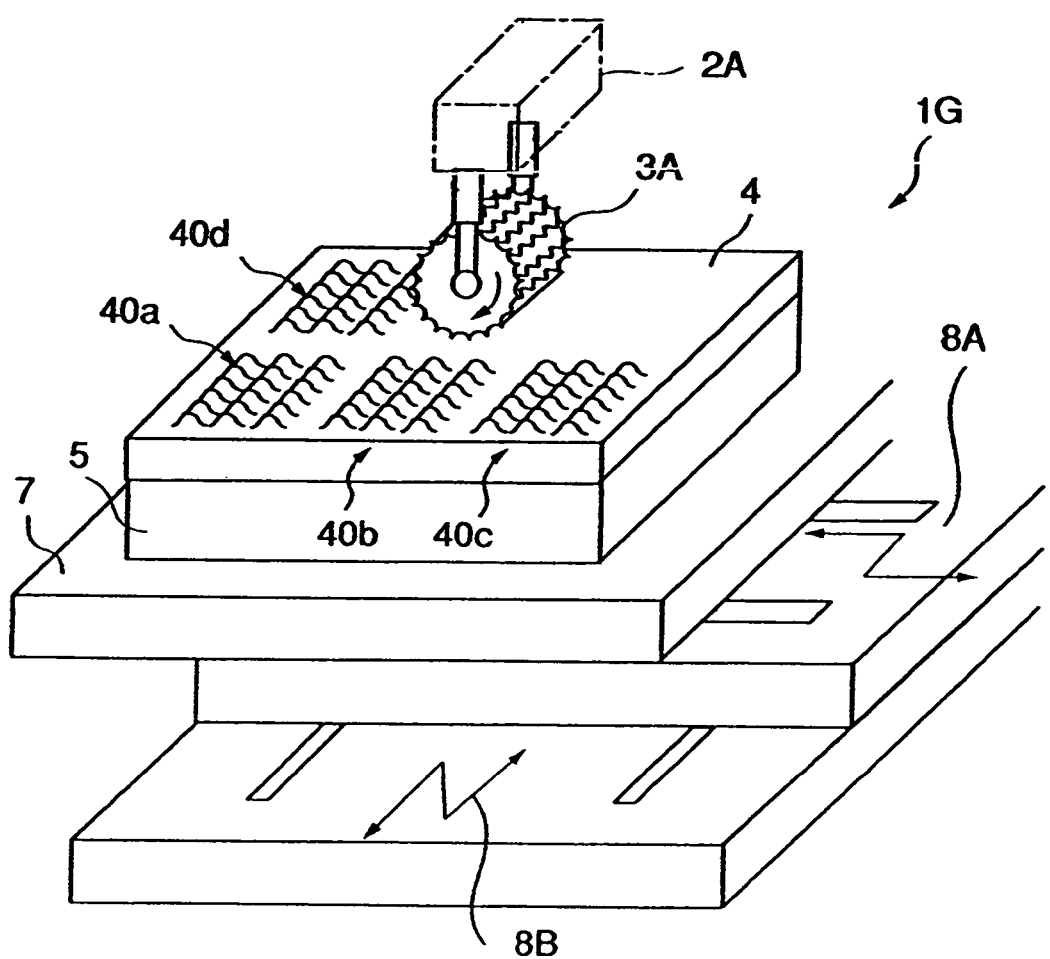
FIG. 8 illustrates the main part of a micro-asperity pattern forming apparatus according to a seventh embodiment of the invention for forming a micro-asperity pattern on a resin thin film.

FIG. 8 illustrates the main part of a micro-asperity pattern forming apparatus 1G according to a seventh embodiment for forming an asperity pattern on a resin thin film. The seventh embodiment of FIG. 8 is different from the third embodiment of FIG. 4 in that the pressurizing mechanism 2A which holds the embossment roll 3A rotatably is configured so as to be movable in the vertical direction while applying pressure to the resin thin film 4, and that a moving mechanism 8A is placed on an embossment-roll-rotation-axis-direction moving mechanism 8B so as to be movable in the embossment roll rotation axis direction.

In the apparatus according to the seventh embodiment that is configured as described above, micro-asperity patterns having desired lengths can be formed at desired intervals as exemplified by micro-asperity patterns 40a–40d in FIG. 8 by moving the pressurizing mechanism 2A in the vertical direction during movement of the transfer stage 7. Therefore, micro-asperity patterns can be arranged either regularly or arbitrarily.

Figure 9:
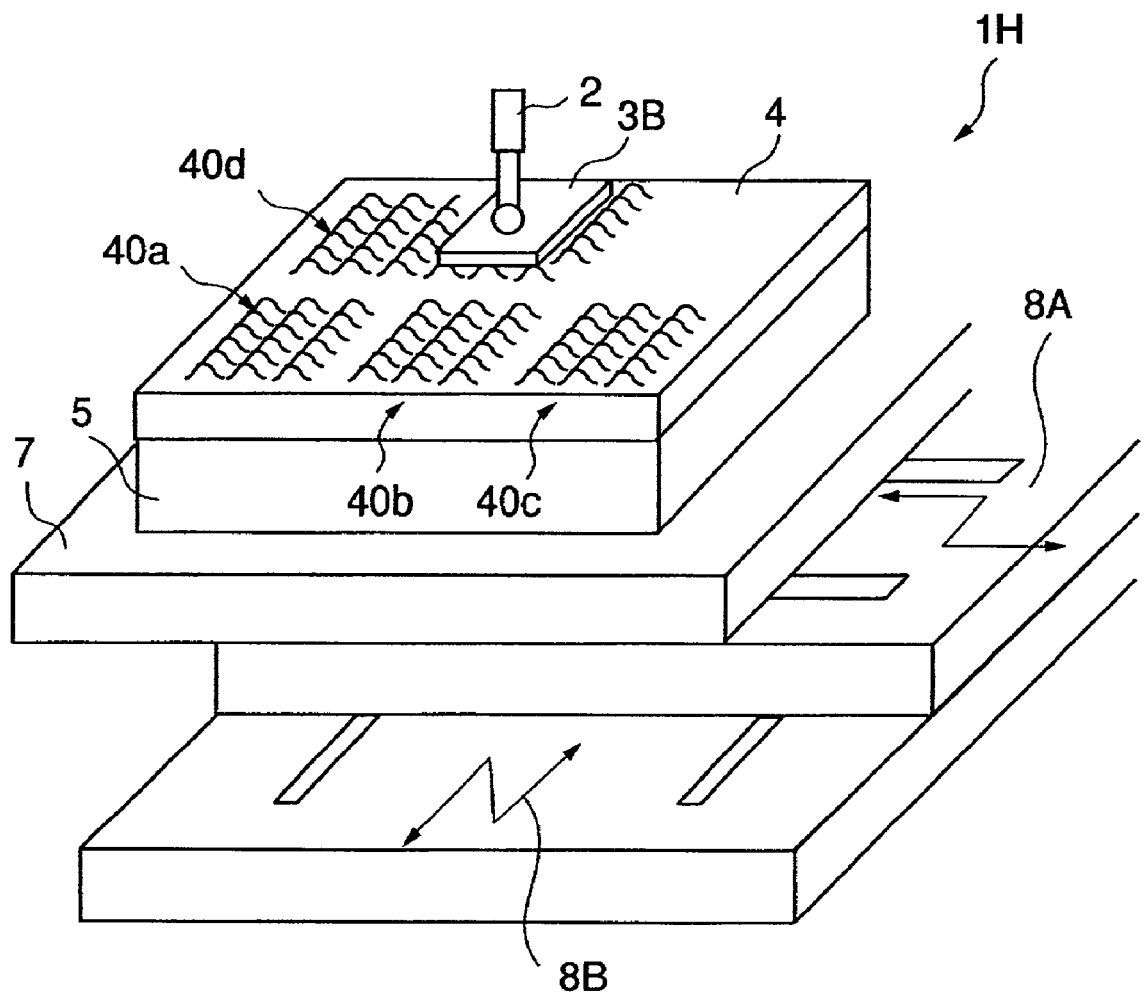
FIG. 9 illustrates the main part of a micro-asperity pattern forming apparatus according to an eighth embodiment of the invention for forming a micro-asperity pattern on a resin thin film.

FIG. 9 illustrates the main part of a micro-asperity pattern forming apparatus 1H according to an eighth embodiment for forming an asperity pattern on a resin thin film. The eighth embodiment of FIG. 9 is different from the seventh embodiment of FIG. 8 in that a stamper 3B that is pressed against to the resin thin film 4 is held by the pressurizing mechanism 2, and that the apparatus is so configured that the pressurizing mechanism 2 can produce pressure of several megapascals to thousands of megapascals. The pressurizing mechanism 2 is configured as to be movable in the vertical direction.

In the apparatus according to the eighth embodiment that is configured as described above, the asperity pattern of the stamper 3B is pressed against the resin thin film 4 by the pressurizing mechanism 2 in the state that the substrate 5 is held by the transfer stage 7, whereby micro-asperity patterns 40a–40d are formed on the top surface of the resin thin film 4.

In the eighth embodiment, micro-asperity patterns having desired lengths can be formed at desired intervals as exemplified by the micro-asperity patterns 40a–40d in FIG. 9 by moving the transfer stage 7 in a state that the pressurizing member 2 is raised. Therefore, micro-asperity patterns can be arranged either regularly or arbitrarily.

Figure 10:
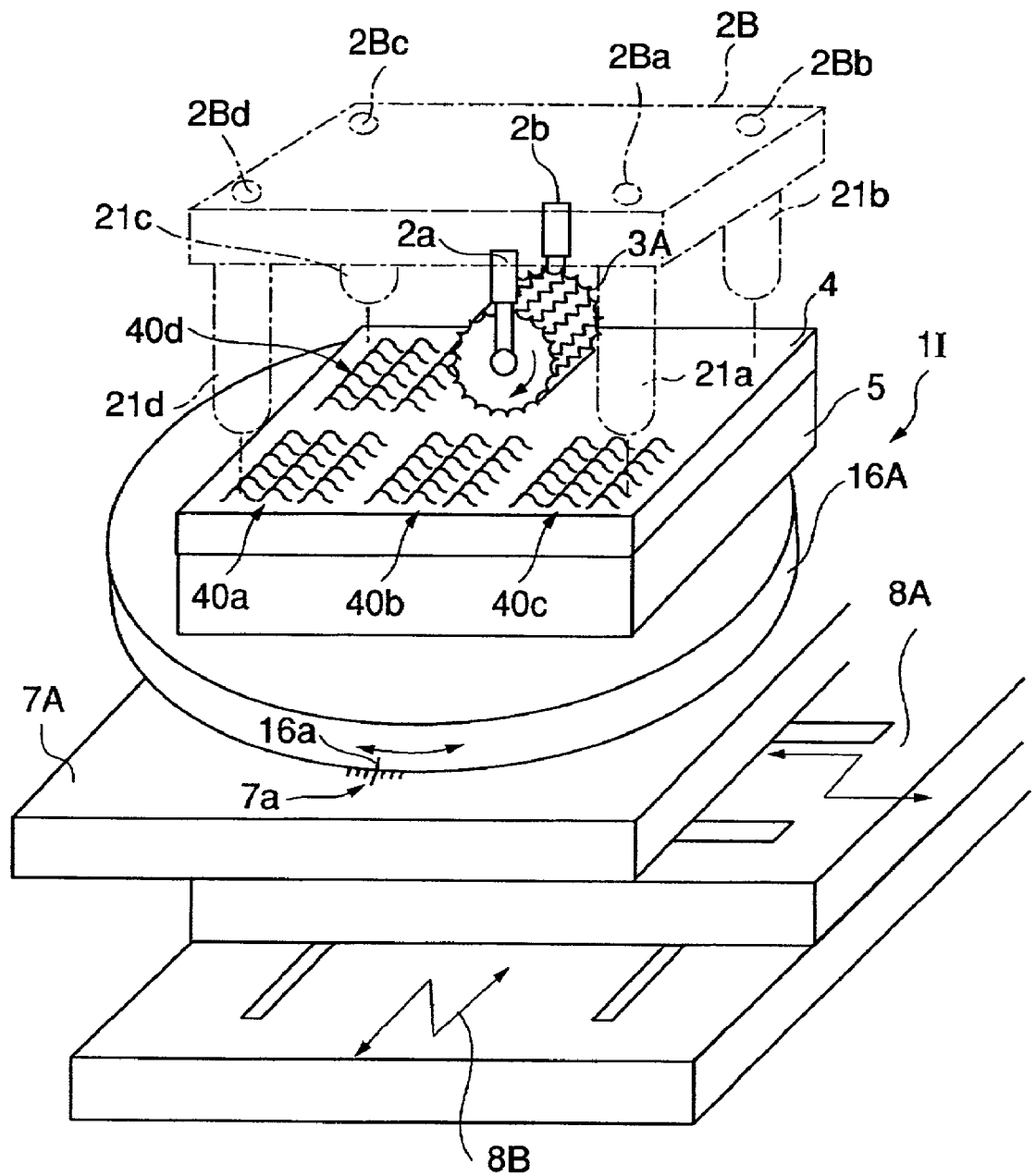
FIG. 10 illustrates the main part of a micro-asperity pattern forming apparatus according to a ninth embodiment of the invention for forming a micro-asperity pattern on a resin thin film.

FIG. 10 illustrates the main part of a micro-asperity pattern forming apparatus 1I according to a ninth embodiment for forming an asperity pattern on a resin thin film, which is an improved version of the apparatus of FIG. 8. The ninth embodiment of FIG. 10 is different from the seventh embodiment of FIG. 8 in that a substrate rotation direction adjustment mechanism 16A is interposed between a transfer stage 7A and the substrate 5, and that a pressurizing mechanism 2B is provided that has alignment mark observation optical devices 21 (21a–21d) capable of reading alignment marks on the substrate 5 or the resin thin film 4.

The substrate 5 is vacuum-absorbed on the substrate rotation direction adjustment mechanism 16A. Alternatively, the substrate 5 may be held by electrostatic absorption or by some other holding means.

The substrate rotation direction adjustment mechanism 16A is held by the transfer stage 7A rotatably. A fixing manipulation for fixing the mechanism 16A to the transfer stage 7A and a releasing manipulation for releasing the mechanism 16A from the transfer stage 7A to make it rotatable can be performed by manipulating a manipulation lever that is disposed at a position not shown in FIG. 10.

A fine adjustment dial is disposed a position not shown in FIG. 10. The apparatus is so configured that the substrate rotation direction adjustment mechanism 16A can be rotated by manipulating the fine adjustment dial. An index 16a that is provided on the mechanism 16A and movement distance marks 7a that are provided on the transfer stage 7A provide a rough measure for a rotation angle adjustment on the substrate 5.

Although in this embodiment the substrate rotation direction adjustment mechanism 16A is provided between the transfer stage 7A and the substrate 5, the position of the mechanism 16 is not limited to such a position. For example, the mechanism 16 may be provided under the embossment-roll-rotation-axis-direction moving mechanism 8B.

Illumination light sources are provided in the substrate rotation direction adjustment mechanism 16A at positions corresponding to the respective alignment mark observation optical devices 21a–21d. On the other hand, the top surface of the pressurizing mechanism 2B is formed with observation windows 2B (2Ba–2Bd) through which to read, via the alignment mark observation optical devices 21a–21d, alignment marks that are provided on the front surface of the substrate 5 that is located under the resin thin film 4.

Figure 11A:
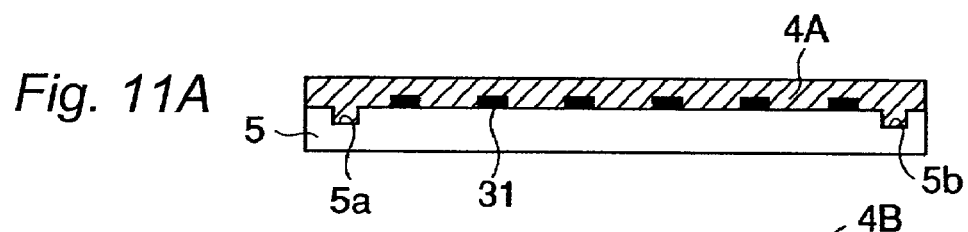
FIGS. 11A–11D illustrate the main parts of the micro-asperity pattern forming apparatus according to the ninth embodiment having alignment mark observation devices over a reflection plate.
Figure 11B:
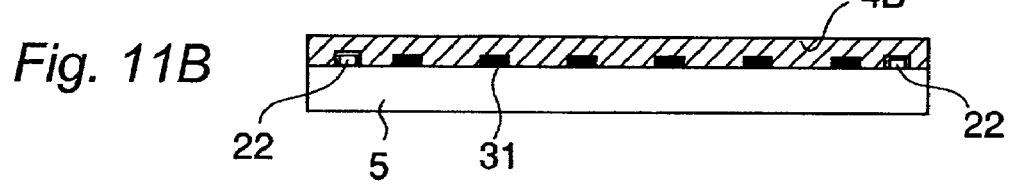
Figure 11C:
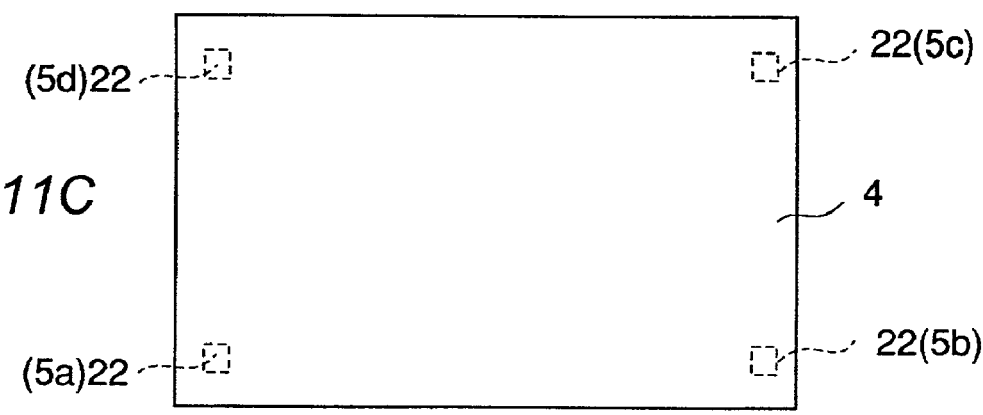

Next, the alignment marks will be described with reference to FIGS. 11A–11D. In the case of a color liquid crystal display device, as shown in FIGS. 11A and 11B, alignment marks 5a and 5b or 22 are provided to register a color filter layer (not shown) with the liquid crystal driving elements 31 that are formed on the substrate 5. Likewise in FIG. 11C alignment marks 5c and 5d or 22 can also be seen.

The structure of FIG. 11A is produced in the following manner. After recesses 5a and 5b as alignment marks are formed on the substrate 5, liquid crystal driving elements 31 such as TFTs are formed by repeating steps of forming a metal film on the surface of the substrate 5 by sputtering, coating the metal film with a resist by spin coating, setting the resist by baking it at a high temperature, exposing the resist to ultraviolet light through a proper mask, removing exposed portions of the resist with a developer, again performing baking at a high temperature, etching away uncovered portions of the metal film, and removing the remaining portions of the resist with a remover. Finally, a resin thin film 4A is formed on the surface of the substrate 5 by spin coating. The resin film 4 fills the recesses 5a and 5b.

In the case of FIG. 11B, after alignment marks 22 and liquid crystal driving elements 31 such as TFTs are formed on the surface of the substrate 5 by the above-described method, a resin thin film 4B is formed on the surface of the substrate 5 by spin coating.

Figure 11D:
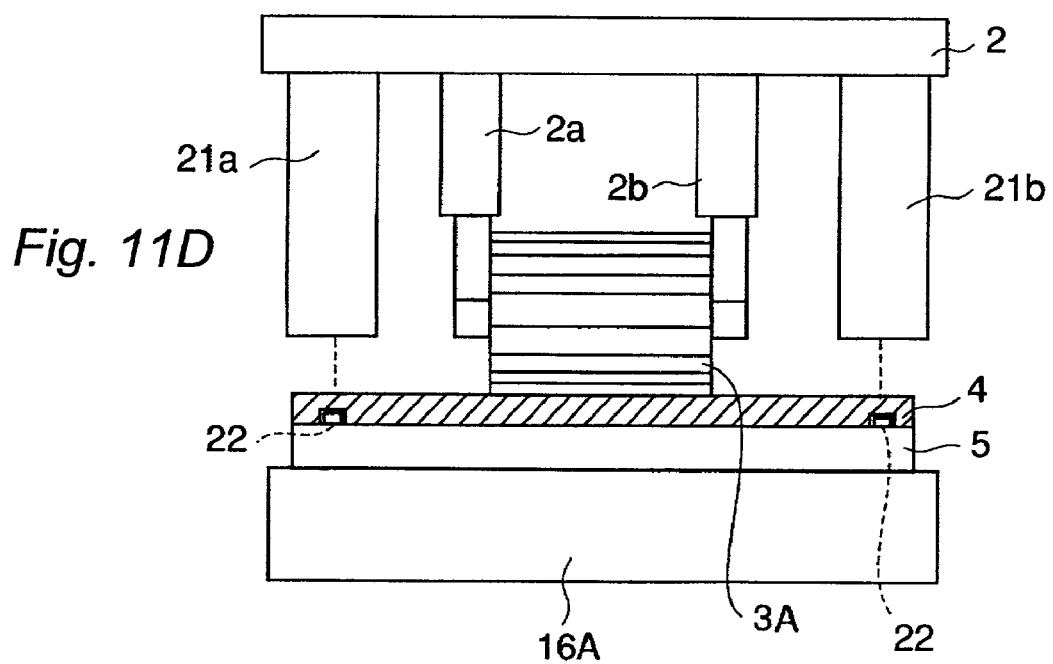

FIG. 11D schematically shows the members located between the substrate rotation direction adjustment mechanism 16A and the pressurizing mechanism 2B as viewed from the right side in FIG. 10.

Next, the operation of the above-configured asperity pattern forming apparatus 1I according to the ninth embodiment will be described with reference to FIG. 10.

Projection images of the alignment marks produced by the alignment mark observation devices 21a–21d are observed through the observation windows 2Ba–2Bd. If positions of the alignment marks that are formed on the substrate 5 deviate from reference positions of the alignment mark observation devices 21a–21d, movement adjustments are performed by the embossment-roll-rotation-axis-direction moving mechanism 8B and/or the substrate rotation direction adjustment mechanism 16A, whereby the deviations from the reference positions are made within a prescribed reference value.

Then, the transfer stage 7A is moved to a right-hand initial position. At the initial position, the pressurizing mechanism 2B is lowered to a prescribed position and the transfer stage 7A is moved leftward while the pressurizing mechanism 2 applies prescribed pressure to the resin thin film 4, whereby micro-asperity patterns 40a–40c are formed.

After the first leftward movement of the transfer stage 7A, the pressurizing mechanism 2B is elevated to the initial position, the moving mechanism 8A is moved to the viewer's side in FIG. 10 by a prescribed distance by the embossment-roll-rotation-axis-direction moving mechanism 8B, and the transfer stage 7A is returned to the right-hand initial position. The pressurizing mechanism 2B is again lowered to the prescribed position and the transfer stage 7A is moved leftward while the pressurizing mechanism 2B applies the prescribed pressure to the resin thin film 4, whereby micro-asperity patterns 40d etc. are formed.

In this embodiment, the four alignment mark observation optical devices 21a–21d are used. Alternatively, one or two alignment mark observation optical devices 21 may be used. In this case, position deviations of the alignment marks are determined by driving the embossment-roll-rotation-axis-direction moving mechanism 8B or the moving mechanism 8A and the deviations from the reference positions are made within the prescribed reference value by driving the substrate rotation direction adjustment mechanism 16A.

Although in this embodiment the alignment marks are projected to the observation windows 2Ba–2Bd, they may be displayed on a monitor screen by using a CCD camera or the like.

The alignment marks may be formed by directly processing the substrate 5 itself by wet etching, dry etching, sand blasting, embossment, or the like. Alternatively, a thin film of a metal, an insulator, a resin, or the like may be formed on the surface of the substrate 5 by sputtering, spin coating, evaporation, CVD, or the like and then processed by wet etching, dry etching, sand blasting, embossment, or the like.

In this embodiment, the alignment marks are formed on the surface of the substrate 5. Another configuration is possible in which alignment mark portions are formed, together with the asperity pattern, on the embossment roll 3A at positions distant from alignment marks of the embossment roll 3A and additional alignment marks corresponding to the alignment marks 5a and 5b or 22 are formed on the surface of the resin thin film 4 and observed with the alignment mark observation optical devices 21.

Figure 12:
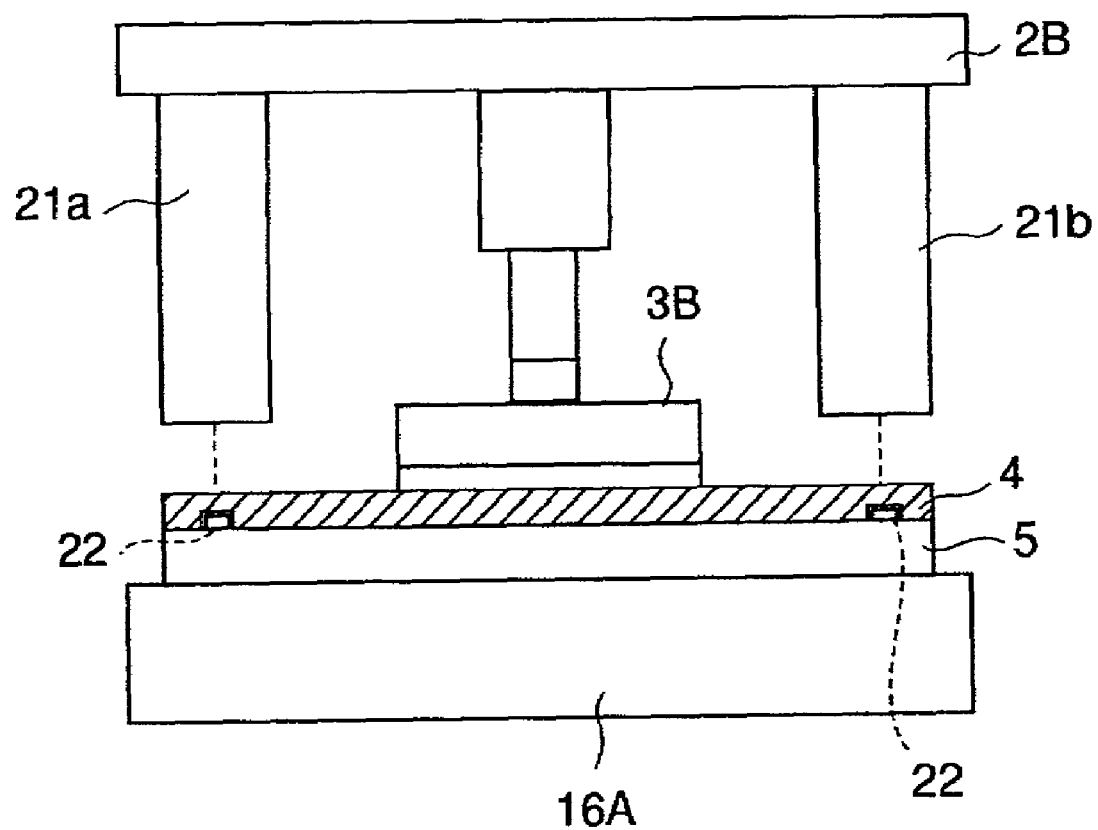
FIG. 12 illustrates the main part of a micro-asperity pattern forming apparatus according to another embodiment having alignment mark observation devices over a reflection plate.

FIG. 12 shows a micro-asperity pattern forming apparatus according to another embodiment in which the embossment roll 3A is replaced by the stamper 3B used in the apparatus of FIG. 9. The other part of the configuration of the apparatus of FIG. 12 is the same as of the apparatus of FIG. 10. Projection images of the alignment marks produced by the alignment mark observation devices 21a–21d are observed through the observation windows 2Ba–2Bd. If positions of the alignment marks 2Ba–2Bd that are formed on the substrate 5 deviate from reference positions of the alignment mark observation devices 21a–21d, movement adjustments are performed by the embossment-roll-rotation-axis-direction moving mechanism 8B and/or the substrate rotation direction adjustment mechanism 16A, whereby the deviations from the reference positions are made within a prescribed reference value.

Then, the transfer stage 7A is moved to a right-hand initial position. At the initial position, the pressurizing mechanism 2B is lowered to a prescribed position and applies prescribed pressure to the resin thin film 4. Then, the transfer stage 7A is moved leftward. In this manner, micro-asperity patterns 40a–40c are formed.

After the first leftward movement of the transfer stage 7A, the pressurizing mechanism 2B is elevated to the initial position, the moving mechanism 8A is moved to the viewer's side in FIG. 12 by a prescribed distance by the embossment-roll-rotation-axis-direction moving mechanism 8B, and the transfer stage 7A is returned to the right-hand initial position. The pressurizing mechanism 2A is again lowered to the prescribed position and applies the prescribed pressure to the resin thin film 4 to form a micro-asperity pattern 40d. Then, the transfer stage 7A is moved leftward. These steps are repeated thereafter, whereby remaining micro-asperity patterns are formed.

Figure 13:
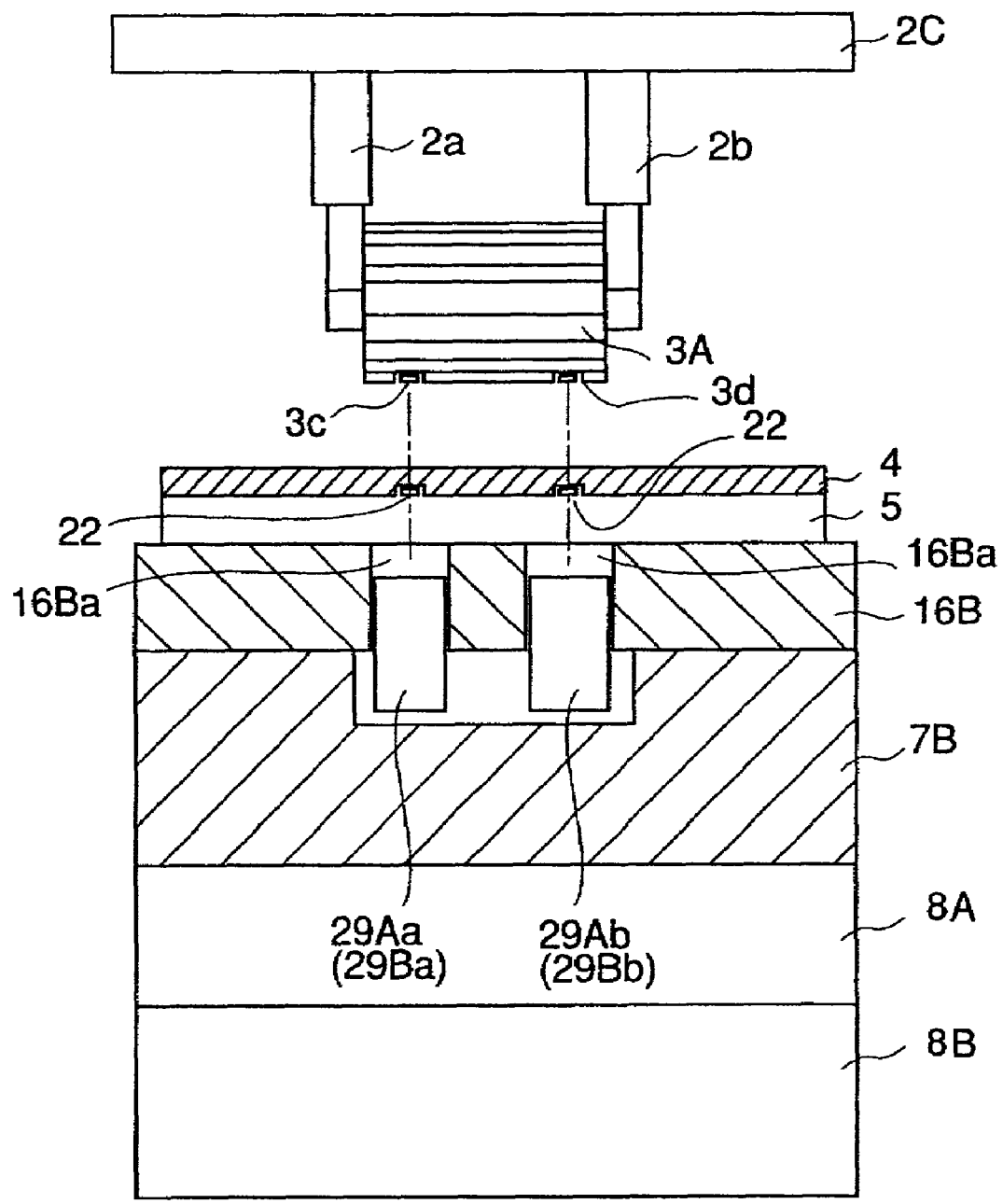
FIG. 13 illustrates the main part of a micro-asperity pattern forming apparatus according to another embodiment having alignment mark observation devices under a reflection plate.
Figure 14A:
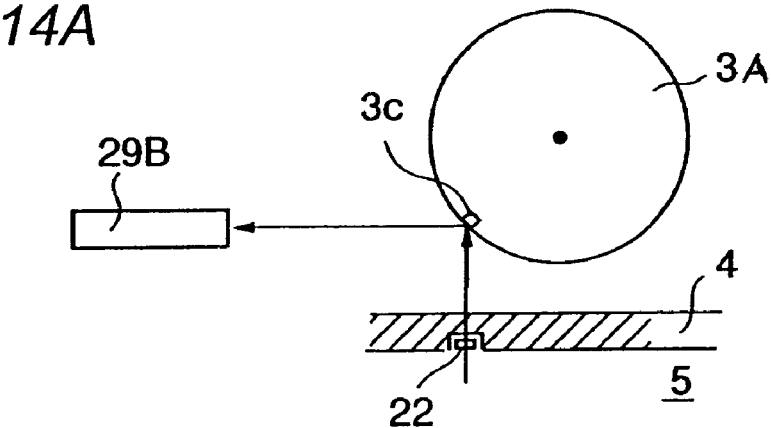
FIGS. 14A–14C illustrate how an alignment mark is observed with alignment mark observation devices.
Figure 14B:
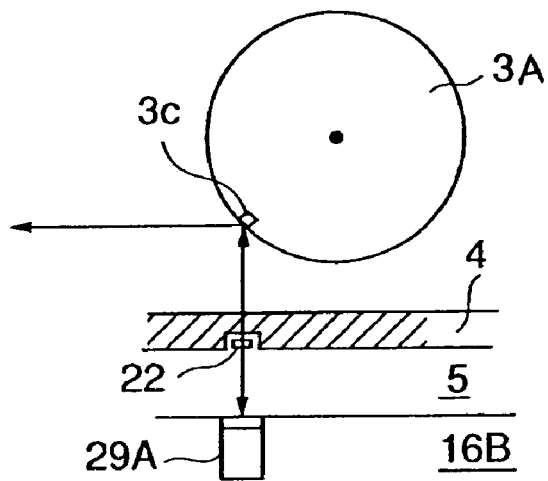
Figure 14C:
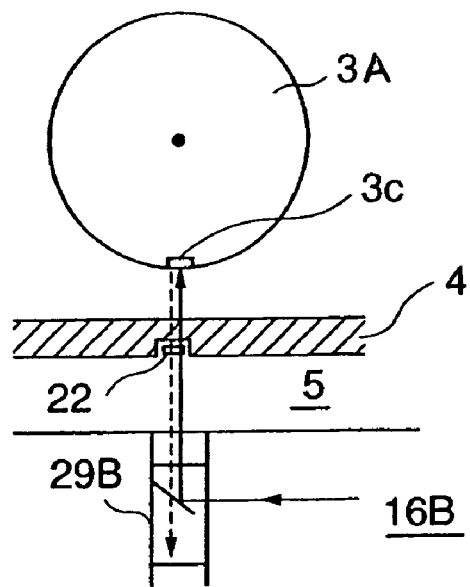

Next, a micro-asperity pattern forming apparatus according to another embodiment having alignment mark observation devices under a reflection plate will be described with reference to FIG. 13. Whereas the apparatus of FIG. 10 has the pressurizing mechanism 2B, the substrate rotation direction adjustment mechanism 16A, and the transfer stage 7A, the apparatus of FIG. 13 uses a pressurizing mechanism 2C, a substrate rotation direction adjustment mechanism 16B, and a transfer stage 7B. An embossment roll 3A that is held by the pressurizing mechanism 2C rotatably is provided with alignment marks 3c and 3d on the outer circumferential surface that is formed with a micro-asperity pattern. A substrate 5 is held by the substrate rotation direction adjustment mechanism 16B. Through-holes 16Ba are formed through the substrate rotation direction adjustment mechanism 16B, and alignment mark observation optical devices 29Aa and 29Ab are provided in and held by the respective through-holes 16Ba. Photodetecting means are provided in the respective alignment mark observation optical devices 29Aa and 29Ab and connected to a monitor via a computer (not shown).

Where the alignment mark observation optical devices 29Aa and 29Ab have fields of view that are wider than an adjustment range, they may be held by the transfer stage 7B. Another configuration is possible in which an alignment mark observation optical device 29B is disposed at such a position as to be able to view the alignment mark 3c on the outer circumferential surface of the embossment roll 3A as shown in FIG. 14A and the alignment mark observation optical device 29B detects light that comes via the substrate-5-side alignment mark 22. Still another configuration is possible in which an alignment mark observation optical device 29A is disposed under the substrate 5 as shown in FIG. 13 and detects light coming via the alignment mark 3c from outside the resin thin film 4 as shown in FIG. 14B. Yet another configuration is possible in which, as shown in FIG. 14C, the alignment mark 3c reflects light coming from an alignment mark observation device 29B via the alignment mark 22 that is located right over the alignment mark observation device 29B and the alignment mark observation device 29B detects resulting reflection light.

Next, the operation of the above-configured micro-asperity pattern forming apparatus of FIG. 13 will be described.

Images of the alignment marks 22 produced by the alignment mark observation devices 29Aa and 29Ab are observed with the above-mentioned monitor. If positions of the alignment marks 22 that are formed on the substrate 5 deviate from reference positions of the alignment mark observation devices 29Aa and 29Ab, movement adjustments are performed by the embossment-roll-rotation-axis-direction moving mechanism 8B and/or the substrate rotation direction adjustment mechanism 16B, whereby the deviations from the reference positions are made within a prescribed reference value.

Then, the transfer stage 7B is moved to an initial position. At the initial position, the pressurizing mechanism 2C is lowered to a prescribed position and the transfer stage 7B is moved while the pressurizing mechanism 2C applies prescribed pressure to the resin thin film 4. An asperity pattern is formed as the embossment roll 3A rolls.

In this embodiment, the two alignment mark observation optical devices 29Aa and 29Ab are used. Alternatively, one or four alignment mark observation optical devices may be used 29Aa, 29Ab, 29Ba, and 29Bb. In this case, position deviations of the alignment marks are determined by driving the embossment-roll-rotation-axis-direction moving mechanism 8B or the moving mechanism 8A and the deviations from the reference positions are made within the prescribed reference value by driving the substrate rotation direction adjustment mechanism 16B.

Figure 15A:
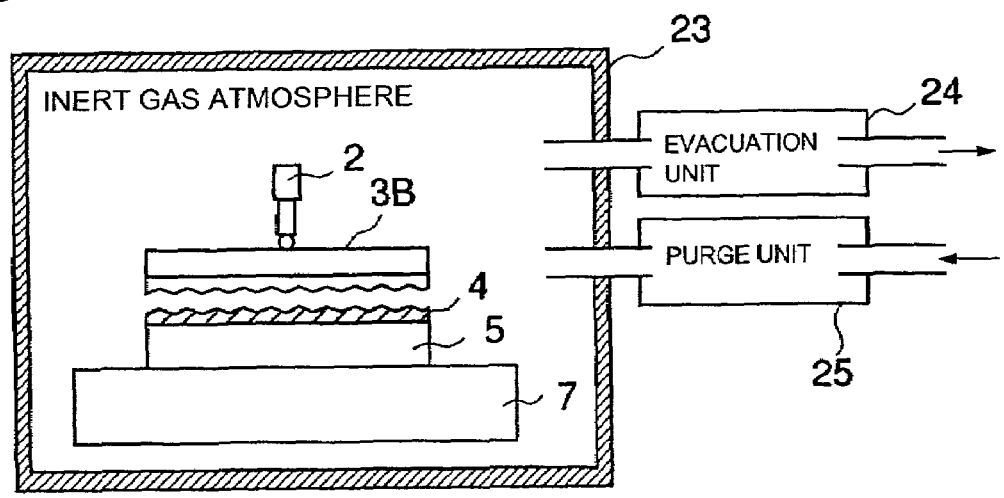
FIGS. 15A and 15B illustrate the main parts of micro-asperity pattern forming apparatuses according to other embodiments, respectively, for forming an asperity pattern on a resin thin film that are provided in an inert gas atmosphere.
Figure 15B:
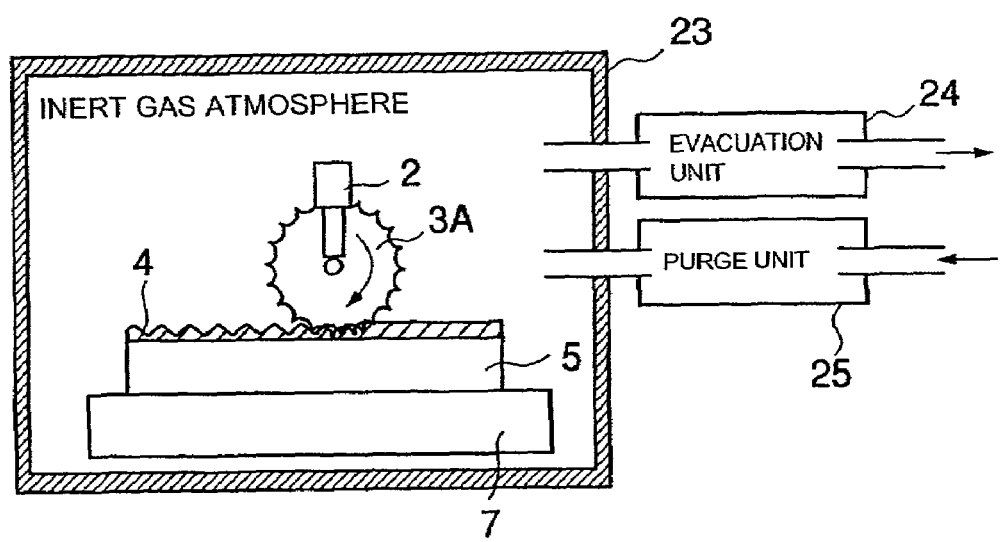

FIGS. 15A and 15B illustrate the main parts of micro-asperity pattern forming apparatuses according to other embodiments, respectively, for forming an asperity pattern on a resin thin film that are provided in an inert gas atmosphere. As shown in FIGS. 15A and 15B, a transfer stage 7 is provided in an airtight chamber 23 and a substrate 5 that is coated with a resin thin film 4 is held by the transfer stage 7 in a detachable manner. A pressurizing mechanism 2 is provided above the resin thin film 4 so as to be movable in the vertical direction and the right-left direction. A stamper 3B (FIG. 15A) or an embossment roll 3A (FIG. 15B) is attached to the pressurizing mechanism 2 rotatably.

An evacuation unit 24 is connected to the chamber 23 so as to be able to exhaust a gas from the chamber 23. Provided with a ventilation fan, a rotary pump, or the like, the evacuation unit 24 can exhaust a gas from the chamber 23 to some extent. A purge unit 25 is also connected to the chamber 23 so as to be able to supply a prescribed gas to the chamber 23. As a mechanism for supplying an inert gas such as $N_2$ or Ar to the chamber 23, a device for controlling a gas flow rate such as a mass flow controller or an APC valve is provided in the purge unit 25. The purge unit 25 is connected to a gas cylinder or a gas refining device as an inert gas supply source (not shown).

In the above-configured micro-asperity pattern forming apparatus according to this embodiment, the substrate 5 that is coated with the resin thin film 4 (spin coating was employed) is fixed to the transfer stage 7. Then, the evacuation unit 24 is caused to start operating, whereby the air is exhausted from the chamber 23. After the operation of the evacuation unit 24 is stopped, the purge unit 25 is caused to start operating, whereby an inert gas is introduced into the chamber 23. Then, in the case of the apparatus of FIG. 15B, for example, the pressurizing mechanism 2 is moved rightward from a left-hand initial position in the chamber 23 while applying prescribed pressure to the resin thin film 4, whereby an asperity pattern is formed on the resin thin film 4.

In these embodiments, the air is exhausted from the chamber 23 in advance by the evacuation unit 24. Therefore, oxygen and impurities contained in the air inside the chamber 23 are exhausted and a micro-asperity pattern can be formed in a clean, inert gas atmosphere. This makes it possible to not only prevent the resin thin film 4 from being oxidized or changed in quality but also prevent a phenomenon that impurities stick to the resin thin film 4 during formation of a micro-asperity pattern and are finally fixed to the micro-asperity pattern formed, whereby the production yield of an optical device can be increased.

Although in the embodiment of FIG. 15B the pressurizing mechanism 2 is made movable in the right-left direction, it goes without saying that the transfer stage 7 may be moved by the moving mechanism 8 and the substrate rotation direction adjustment mechanism 16A or 16B may be used.

Figure 16A:
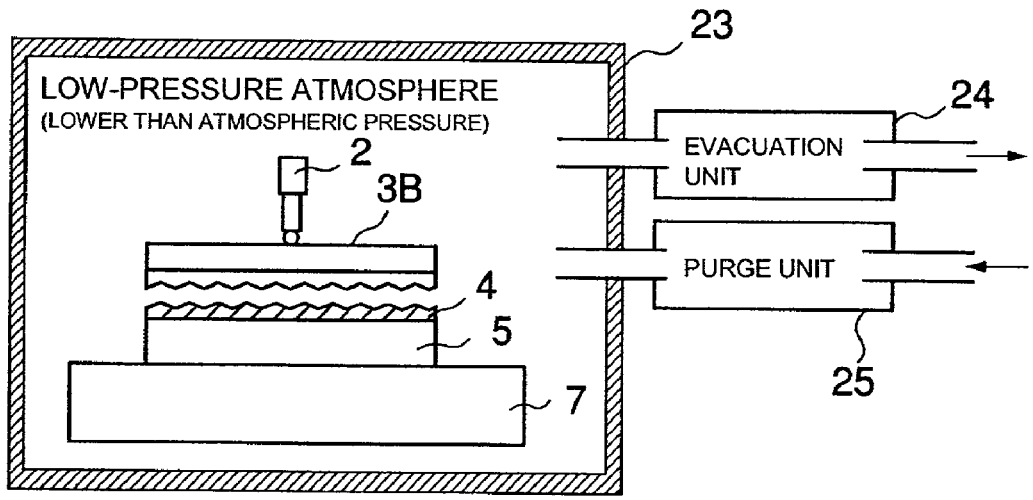
FIGS. 16A and 16B illustrate the main parts of micro-asperity pattern forming apparatuses according to other embodiments, respectively, for forming an asperity pattern on a resin thin film that are provided in a low-pressure atmosphere.
Figure 16B:
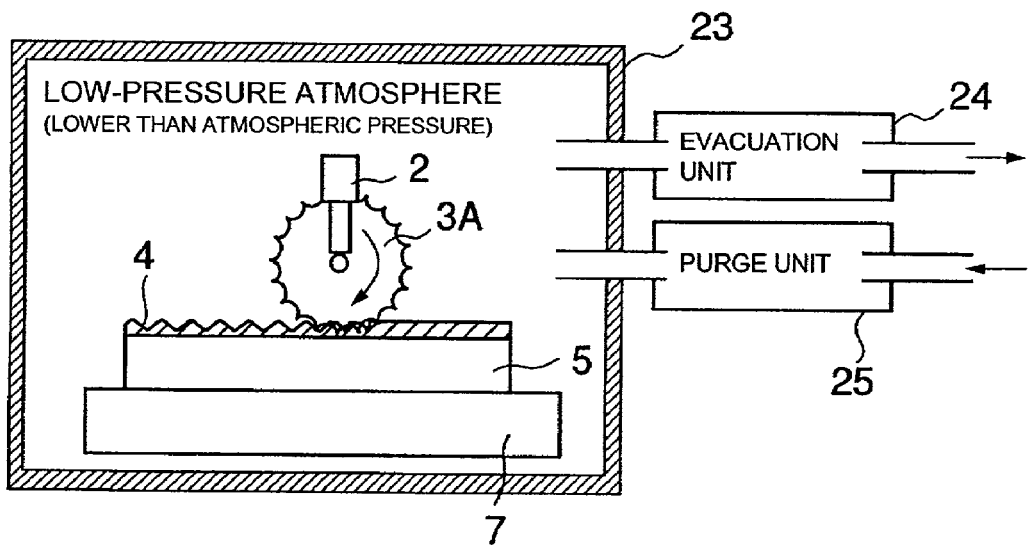

FIGS. 16A and 16B illustrate the main parts of micro-asperity pattern forming apparatuses according to other embodiments for forming an asperity pattern on a resin thin film that is provided in a low-pressure atmosphere. These embodiments are different from the embodiments of FIGS. 15A and 15B in that in the chamber 23 an optical device is manufactured in a low-pressure (lower than atmospheric pressure) atmosphere rather than in an inert gas atmosphere.

The evacuation unit 24 that is connected to the chamber 23 is provided with a rotary pump, a turbo pump, a diffusion pump, or the like so as to be able to exhaust a gas from the chamber 23 to establish a pressure of $10^{-3}$ to $10^{-7}$ Torr inside the chamber 23. An inert gas such as $N_2$ or Ar may be supplied to the chamber 23 by the purge unit 25. Or an optical device may be manufactured without introducing an inert gas.

In these embodiments, the air is exhausted from the chamber 23 in advance by the evacuation unit 24. Therefore, oxygen and impurities contained in the air inside the chamber 23 are exhausted and a micro-asperity pattern can be formed in a clean, inert gas atmosphere.

Particularly where the pressure inside the chamber 23 is lowered, water is easily evaporated and exhausted and hence air is no longer trapped between the die and the resin thin film 4. This prevents a phenomenon that impurities, vapor, etc. that suspend during formation of a micro-asperity pattern stick to the resin thin film 4 and are finally fixed to the micro-asperity pattern formed.

The resin thin film 4 is prevented from being oxidized or changed in quality, and a micro-asperity pattern that is free of air bubbles can be formed. If air bubbles existed, they would act as a damper at the time of pressurization and hence necessitate stronger pressing force. Without air bubbles, the pressing force can be made weaker, as a result of which residual stress in a micro-asperity pattern formed decreases. Therefore, the production yield of an optical device can be increased.

Figure 17:
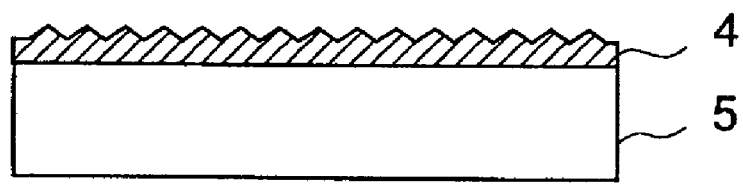
FIG. 17 shows a substrate that is provided with a resin thin film having a micro-asperity pattern.

According to any of the above embodiments, a micro-asperity pattern can be formed on the resin thin film 4 that is formed on the substrate 5 as shown in FIG. 17. An optical device that is provided with the resin thin film 4 having the micro-asperity pattern thus formed can be used as a transparent diffraction grating substrate, a hologram, an optical storage medium such as an optical disc, a Fresnel lens, a micro-lens array, an optical waveguide, or the like by properly selecting an asperity pattern shape, a material of the resin thin film 4, a material of the substrate 5, etc.

Figure 18:
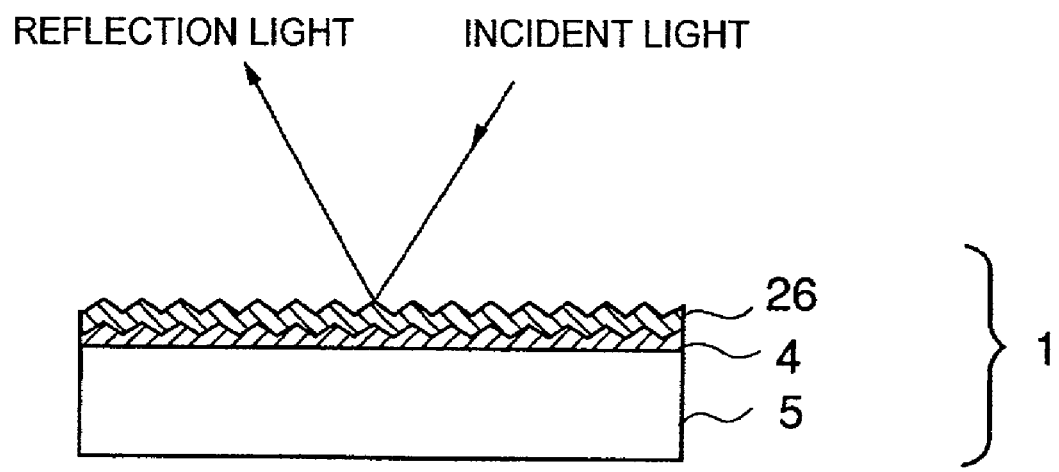
FIG. 18 shows a reflection plate in which a micro-asperity pattern is coated with a reflection film.

A reflection plate shown in FIG. 18 can be manufactured by forming a reflection film 26 by depositing a high reflectivity material such as Al, Ag, an Al alloy, or an Ag alloy on the micro-asperity pattern surface of the above substrate at a thickness of about 2,000 Å by sputtering, evaporation, or the like.

In this case, the adhesiveness between the resin thin film 4 and the reflection film 26 can be increased by laying an intermediate film made of Tr, Cr, Si, or the like between the resin thin film 4 and the reflection film 26, that is, by forming the reflection film 26 after coating the micro-asperity pattern surface with the intermediate film.

The above reflection plate can be used as an optical device such as a hologram, a Fresnel mirror, or a micro-mirror array. The above reflection plate can be used as an electrode substrate of a liquid crystal display device of an STN type or the like by forming a metal thin film as the reflection film 26 and planarizing and sealing the metal thin film by spin-coating its surface with an insulating film such as a transparent resin thin film of polyimide, an acrylic resin, or the like.

Figure 19:
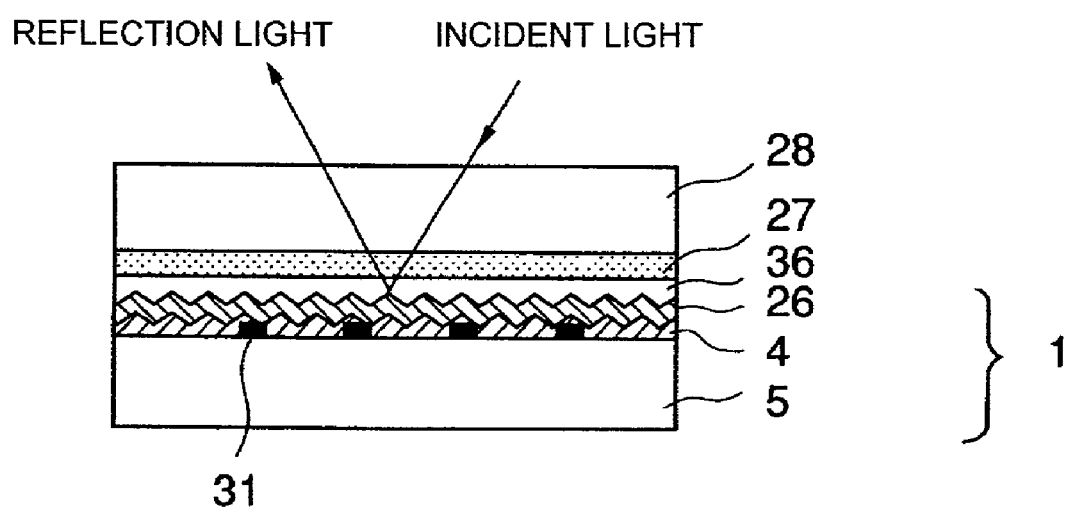
FIG. 19 shows a reflection-type liquid crystal display device.
Figure 20:
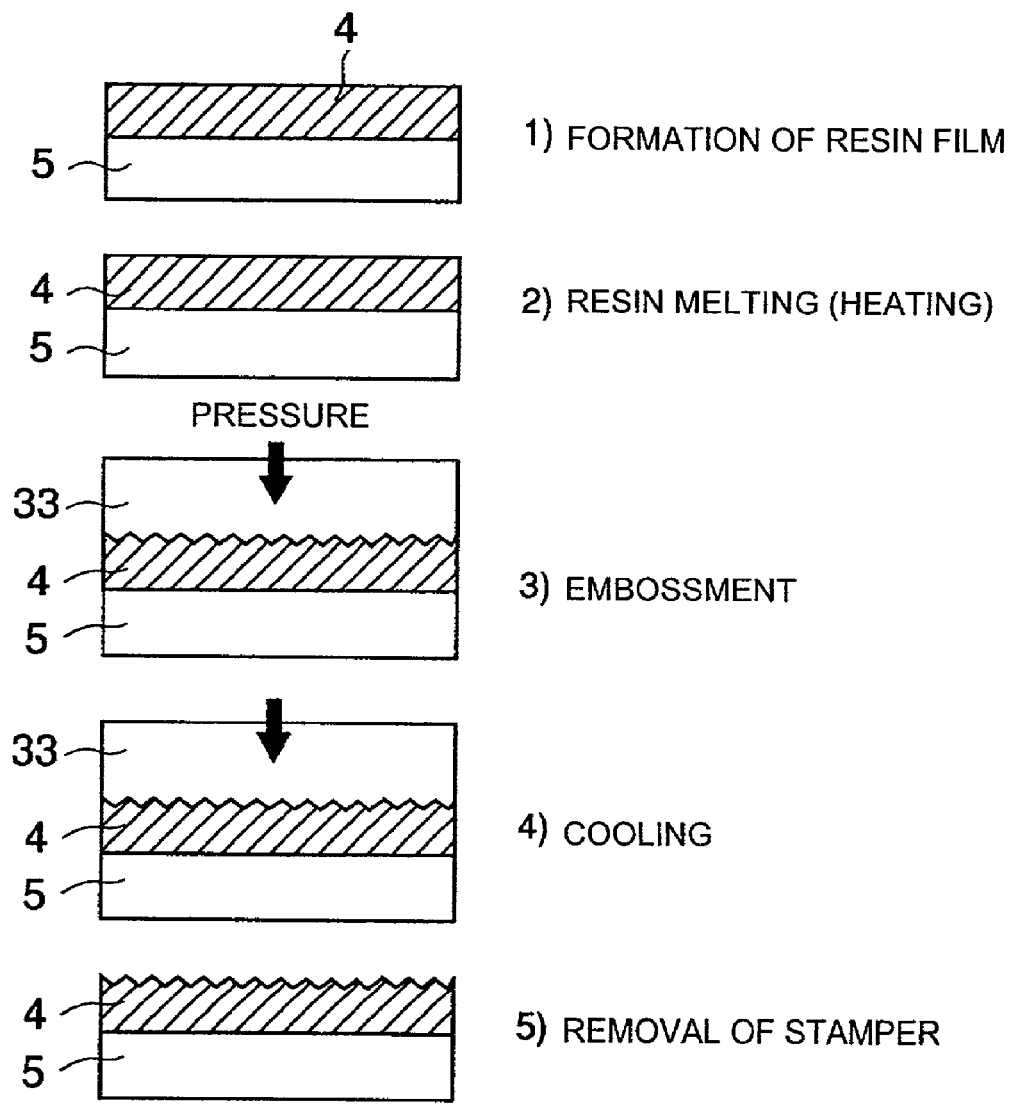
FIG. 20 illustrates a conventional micro-asperity pattern forming method.

FIG. 19 shows a liquid crystal display device according to an embodiment of the invention. A substrate 5 is made of no-alkali glass or a highly heat-resistant resin (molded). Liquid crystal driving elements 31 such as TFTs are formed on the surface of the substrate 5.

The reflection plate 1 of FIG. 18 can be used in not only the reflection-type liquid crystal display device but also other reflection-type display devices. Although not shown in any drawings, the reflection plate 1 of FIG. 18 can also be used as what is called a semi-transmission-type liquid crystal display device in which the power consumption of the backlight light source is set low or incident light is introduced through a member other than the liquid crystal panel.

Although the reflection plate of FIG. 18 is a front-surface-reflection-type reflection plate in which the micro-asperity pattern is formed on the front surface of the reflection plate and incident light is reflected by the surfaces of asperities. The invention can also be applied to a back-surface-reflection-type reflection plate in which a glass or transparent resin substrate is used and incident light is reflected by a micro-asperity pattern that is formed on the back surface of the substrate.

The reflection-type liquid crystal display device having the above-configured reflection plate 1, can be used as a display of electronic equipment such as a cellular phone and low-power-consumption-type radio equipment.

It goes without saying that the reflection plate 1 can be used in not only such electronic equipment but also portable information terminals such as an electronic note, a portable computer, and a portable TV receiver.

As described above, according to the invention, a micro-asperity pattern is formed in such a manner that the temperature of a resin thin film that is formed on a substrate is controlled to a temperature that is higher than the glass-transition temperature and lower than the thermal decomposition starting temperature. Therefore, the micro-asperity pattern does not lose its shape even if baking is performed at 200° C. in a later alignment film forming step.

What is claimed is:

1. A method for manufacturing an optical device, comprising:
    coating a substrate with a resin thin layer, wherein temperature of the resin thin layer is controlled lower than a polymerization reaction starting temperature thereof and the resin is not substantially polymerized;
    heating the resin thin layer to a temperature higher than polymerization reaction starting temperature and glass-transition temperature but lower than a thermal decomposition starting temperature of the resin so that the resin thin layer is polymerized on the substrate to form a resin thin film thereon;
    pressing a stamp having an inverted micro-asperity pattern against the resin thin film such that a micro-asperity pattern is formed on a surface of the resin thin film, wherein the stamp is pressed against the resin thin film a plurality of times;
    cooling the resin thin film to a temperature lower than the glass-transition temperature;
    separating the stamp from the resin thin film; and
    baking an alignment film on the resin thin film at a temperature lower than the glass-transition temperature to prevent the micro-asperity pattern formed on the surface of the resin thin film from losing shape.

2. The method according to claim 1, wherein the micro-asperity pattern is formed on the surface of the resin thin film in an inert gas atmosphere.

3. The method according to claim 1, wherein the micro-asperity pattern is formed on the surface of the resin thin film in a chamber, and pressure inside the chamber is maintained lower than atmospheric pressure.

* * * * *